United States Patent [19]
Bielak et al.

[11] Patent Number: 5,873,049
[45] Date of Patent: Feb. 16, 1999

[54] ABSTRACTION OF MULTIPLE-FORMAT GEOLOGICAL AND GEOPHYSICAL DATA FOR OIL AND GAS EXPLORATION AND PRODUCTION ANALYSIS

[75] Inventors: James W. Bielak; Douglas T. Steeb, both of Carrollton, Tex.

[73] Assignee: Atlantic Richfield Company, Los Angeles, Calif.

[21] Appl. No.: 803,987

[22] Filed: Feb. 21, 1997

[51] Int. Cl.$^6$ .................................................. E21B 01/00
[52] U.S. Cl. ........................ 702/6; 702/1; 702/2; 702/6; 702/11; 702/16; 702/24; 395/200.35; 395/200.47
[58] Field of Search ................................. 702/6, 1, 2, 11, 702/16, 24, 14; 707/103; 395/200.35, 200.47, 500

[56] References Cited

U.S. PATENT DOCUMENTS

| | | | |
|---|---|---|---|
| 5,291,583 | 3/1994 | Bapat | 395/500 |
| 5,295,256 | 3/1994 | Bapat | 395/500 |
| 5,724,575 | 3/1998 | Hoover et al. | 707/10 |

OTHER PUBLICATIONS

Linton, "Encapsulating a C++ Library", *Proceedings of 1992 Usenix C++ Conference*, pp. 57–66.

Gamma, et al., *Design Patterns: Elements of Reusable Object–Oriented Software* (Addison–Wesley, 1995), pp. 87–95.

*Primary Examiner*—Thomas Peeso
*Attorney, Agent, or Firm*—Anderson, Levine & Lintel

[57] ABSTRACT

A computer system and method of operating the same, to execute multiple analysis application programs upon multiple persistent databases, each arranged to a vendor-specific format for geological and geophysical data, is disclosed. According to the disclosed embodiments of the invention, an abstract object interface is provided, by way of which the analysis application program need not be aware of the vendor format of the persistent database upon which operations are being executed. The abstract object interface includes program code by way of which, upon execution, a hierarchy of objects are instantiated. Prior to instantiating objects according to the geologically-related information, the user selects a particular source of data, for example by selecting a catalog corresponding to one of the vendor formats. At this time, objects corresponding to the contents of the selected persistent database are instantiated, incorporating vendor-specific function elements that may be called by the abstract objects, as necessary. The analysis application program is then able to retrieve and process data from the database by executing function members of the abstract objects (either directly, or by indirectly calling the vendor-specific code), without knowledge of the vendor format of the underlying persistent database.

25 Claims, 11 Drawing Sheets

ABSTRACTION OF MULTIPLE-FORMAT GEOLOGICAL AND GEOPHYSICAL DATA FOR OIL AND GAS EXPLORATION AND PRODUCTION ANALYSIS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of data analysis in the hydrocarbon industry, and is more specifically directed to data processing techniques used therein.

In the oil and gas industry, significant effort is spent in understanding the location, size, and contents of subsurface hydrocarbon reserves, both under land formations and also offshore. Of course, knowledge regarding these attributes of oil and gas reservoirs can, at best, be obtained indirectly, given their location. The field of oil and gas prospecting has developed many different approaches toward gathering the necessary information from which one can deduce the location of important oil and gas reservoirs (i.e., those reservoirs having sufficient accessible quantities of hydrocarbons that production is economically feasible). These various approaches include seismic prospecting, gravity surveys, magnetic field surveys, core sampling, and well logging, to name only a few. Modern oil and gas prospecting utilizes a combination of information gathered from these and other sources to predict the location of producible quantities of oil and gas.

Because of the wide array of sources of information used in the prospecting process, however, the combining and analysis of the information can be quite cumbersome, even using modern high-performance computing equipment. Typically, the analysis of this information is not performed by a single program or product, but instead a wide array of analysis techniques are typically available, each having a particular advantage or benefit in the analysis, but unfortunately each also requiring a particular expected input data format. Further exacerbating the difficulty of combining data in the analysis operation, similar data is typically obtained by tools or acquisition programs from different vendors, each with their own specific format and approach.

Of course, the geologist or reservoir engineer may use each vendor's analysis program on its own data to produce multiple reports or analyses; combination of these analyses may then be done in a qualitative or, at best, in a quantitative but non-automated manner. The analysis provided by this approach is, of course, less than optimal and is also quite time-consuming. Accordingly, there has been a need to communicate data from multiple sources and formats into multiple analysis programs for automated analysis. Referring now to FIG. 1, a conventional approach to using data from multiple sources with multiple analysis programs is illustrated.

FIG. 1 illustrates a conventional interrelationship of various databases and analysis tools to which an analysis application program may obtain data. In the conventional arrangement of FIG. 1, four databases $V_A$ through $V_D$ are provided. In this example, each of databases $V_A$ through $V_D$ is a conventional arrangement of data gathered from a particular type of tool or input arrangement. For example, database $V_C$ may be a well log database, in which data obtained from a well log tool is formatted and arranged according to a selected format. Similarly, databases $V_A$, $V_B$, $V_D$ are similar databases of other types of well logs, or of associated information such as seismic survey data and the like. In this example, as is typical in the art, databases $V_A$ through $V_D$ are provided by different vendors, and as such are not arranged in a common format. In this conventional example, the human analyst wishes to analyze the data from all four sources of databases $V_A$ through $V_D$ in an automated fashion using analysis application program 10, in order to determine the presence of a hydrocarbon reservoir. Analysis application program 10 is, as typical for analysis programs in the art, is designed for use with some, but not all, of databases $V_A$ through $V_D$. In this example, analysis application program 10 corresponds with databases $V_A$, $V_C$ by way of input/output links. For example, analysis application program 10 may be a program that correlates, or "ties", well log data from database $V_C$ with seismic survey data of database $V_A$. In this example, only two of databases $V_A$ through $V_D$ are directly visible to analysis application program 10.

However, in the conventional arrangement of FIG. 1, the format incompatibility of databases $V_A$ through $V_D$ requires the generation of various translator programs so that data stored in one of databases $V_A$ through $V_D$ may be used in connection with analysis application program 10 associated with a different one of the databases $V_A$ through $V_D$. Accordingly, in this example, twelve translator programs $T_{AB}$ through $T_{DC}$ must be written, installed, and maintained, in order for the data from any one of the databases $V_A$ through $V_D$ to be useful in connection with analysis application program 10. Each of these translator programs T is operated to translate the current database from each of the other formats into a copy contained in its resident format; for example, translators $T_{AC}$, $T_{BC}$, $T_{DC}$ each generate a copy of a respective one of databases $V_A$, $V_B$, $V_D$ and store this copy in database $V_C$. As a result, four copies of each of the databases (one source original, and three translated copies) are resident in the system of FIG. 1.

The overhead programming and database maintenance required for the arrangement is thus substantial. In general, for N vendor databases V, N(N−1) translator programs T are necessary. As such, the addition of each incremental database for use in analysis requires the generation of multiple translator programs (e.g., eight new translators in the case of adding a fifth database $V_E$ to the arrangement of FIG. 1). In addition, the system manager must maintain a large number of input/output links (a minimum of fourteen such links in the case of FIG. 1, where a single analysis application program 10 is in place). The operation of the arrangement of FIG. 1 in performing prospecting or analysis is therefore extremely cumbersome.

In addition, the arrangement of FIG. 1 is also prone to error, considering that multiple copies of the same database are maintained. The system manager must therefore ensure the coherency of the source copy and all translated copies of each database, in the event that any copy is changed by addition, deletion, or editing. Such coherency maintenance is both time-consuming and expensive, and requires rigorous attention to the operation of the system.

The problems caused by data format incompatibilities, as discussed above relative to FIG. 1, are well known in the field of oil and gas data analysis. In response to these problems, database format standards have been proposed for use in the field. Of course, the incorporation of a standard would require conversion of new and existing databases from their existing format to the standard format. In addition, certain database types are maintained in specific formats that provide special benefits to their type of data; the benefits of these specific formats may be lost upon adoption of a "least common denominator" standard. Furthermore, the success of a standard depends upon the willingness of all industry participants to conform to the standard; such willingness is not assured, given the competitive nature of the industry.

By way of further background, object-oriented programming and design techniques are well known in the computer programming art. As fundamental in the object-oriented field, object-oriented computer programs treat merged units of code (computer program instructions) and data as "objects", where the details of the code and data stored in an object are encapsulated, and thus not visible to the outside user. Object-oriented programs communicate with the objects by way of specified "messages", which are functions that serve to read data from, write data to, and operate the objects as desired, according to the protocol of the particular language. Objects in object-oriented programs and databases are generally classified into a hierarchical arrangement of classes, where attributes of higher-level classes are "inherited", or applicable to, the objects in lower-level classes depending therefrom. An example of an object-oriented programming approach is known in the art as the "abstract factory", and is described in Gamma, et al., *Design Patterns: Elements of Reusable Object-Oriented Software*, (Addison-Wesley, 1995), pp. 87–95, incorporated herein by this reference.

Conventional object-oriented programs have typically operated in connection with specific functions; for example, object-oriented statistical programs, object-oriented database programs, and 3-D computer-aided-design object-oriented programs are all known in the art, but operate upon objects that are specifically designed for their application type. The disjointed nature of these object-oriented programs from one another has precluded their use in a unified manner.

Heretofore, the application of object-oriented programming and design to the hydrocarbon database problem of FIG. 1 has not been accomplished for several reasons. Firstly, the databases used by the geologist or reservoir engineer come from vastly diverse sources, such as seismic surveys (which are themselves widely diverse, including such types as velocity surveys, 2-D and 3-D surveys, grids versus tessellated surfaces, etc.), well logs, magnetic or gravitational field surveys, well performance, and others. Secondly, the types of analysis applications that may be applied to the vastly diverse databases are also widely diverse, including such dissimilar applications as statistical evaluation, data translation, graphic visualization, interactive survey design, and the like. As such, the application of object-oriented program design to access the multiple formats of geological and geophysical data necessary to perform an integrated hydrocarbon survey analysis has not been successful to date.

BRIEF SUMMARY OF THE INVENTION

The present invention may be implemented into a method of operating a computer system and a computer system in which multiple analysis application programs and multiple persistent databases that store geologically-related data according to multiple vendor formats are provided. Upon initiation of a selected one of the analysis application programs, the user selects one of the plurality of databases. Upon such selection, at least one concrete object corresponding to the selected persistent database is instantiated as an abstract object, each abstract object including a function member that is operable upon objects corresponding to data stored in each of the plurality of persistent databases, such function members possibly being implemented in vendor-specific code. The analysis application program then processes the geologically-related data corresponding to the instantiated abstract objects, by executing at least one of the function members without specifying one of the plurality of vendor formats.

According to the present invention, therefore, an object-oriented arrangement of oil and gas exploration and production data is provided, where the data are retrieved according to an object-oriented hierarchy that is made available to a plurality of analysis application programs by way of an abstract data model. The present invention enables visibility into each of the databases by each of the analysis application programs, and permits storage of only a single copy of data so that coherency problems are eliminated. Translator programs are also eliminated according to the present invention, facilitating the addition of new database sources.

DETAILED DESCRIPTION OF THE INVENTION

Figure 1:
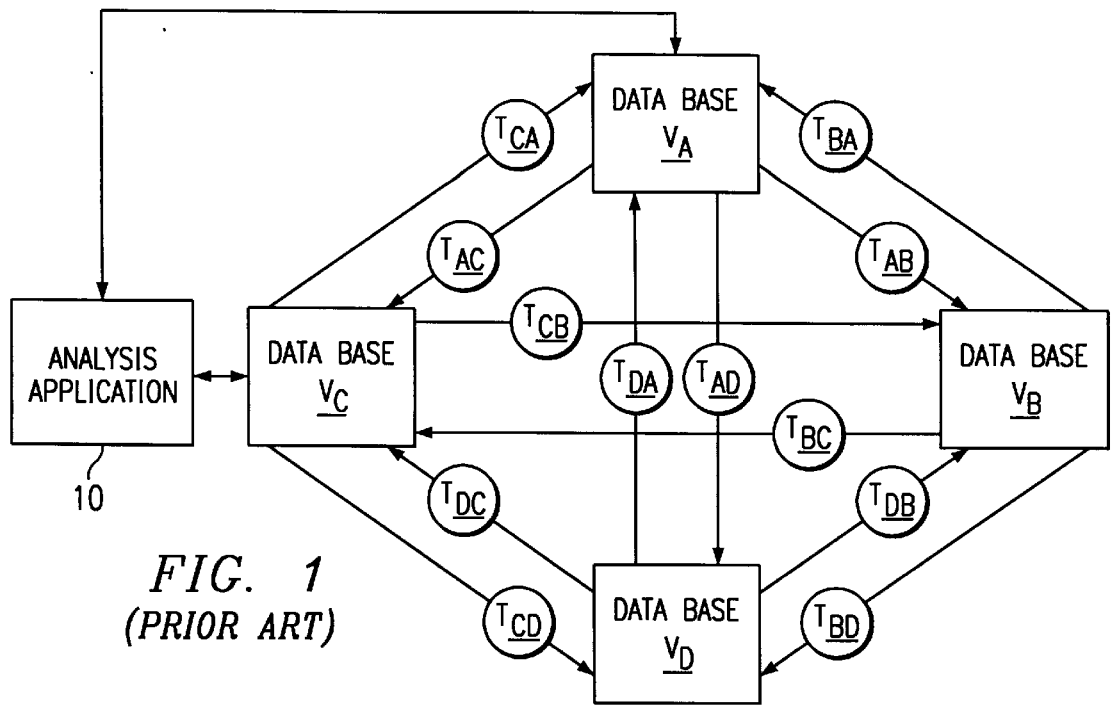
FIG. 1 is an illustration of the interrelationship of databases in a conventional computer system used in the hydrocarbon prospecting and analysis industry.
Figure 2:
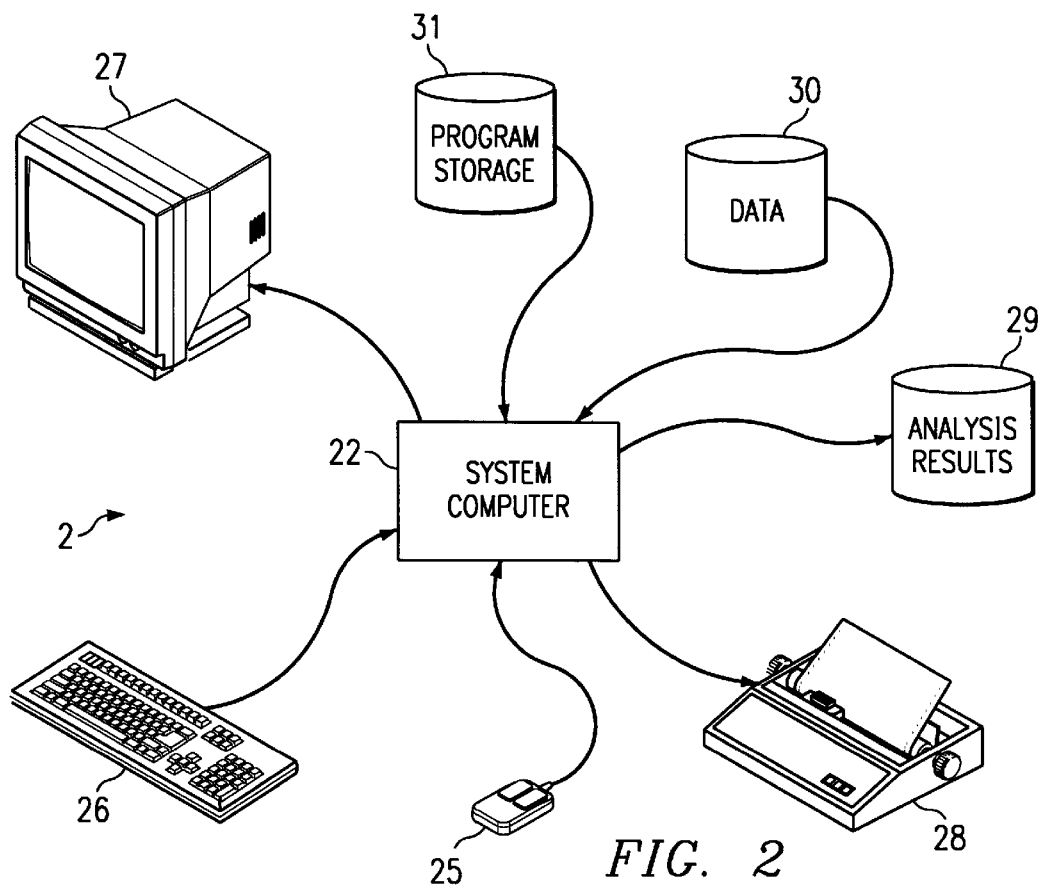
FIG. 2 is an electrical diagram, in block form, of a computer system with which the present invention may be utilized.

Referring now to FIG. 2, computer system 2, into which the preferred embodiment of the present invention may be implemented, will now be described by way of example. This description of computer system 2 is merely an example, as it is to be understood that the present invention may be implemented into a computer system of any suitable architecture, including large mainframe computer systems, distributed computer systems, and the like. It is contemplated that those of ordinary skill in the art will be able to implement the present invention on various arrangements of computer systems.

System 2 includes system computer 22, which may be implemented as any conventional personal computer or workstation, preferably a UNIX-based workstation such as a SPARCstation available from Sun Microsystems, Inc., implemented either in standalone fashion or as part of a network arrangement. System computer 22 is in communication with disk storage devices 29, 30, 31, which are preferably external hard disk storage devices in a network. It is contemplated that disk storage devices 29, 30, 31 are conventional hard disk drives, and as such will be implemented by way of a local area network or by remote access. Of course, while disk storage devices 29, 30, 31, are illustrated as separate devices, a single disk storage device may of course be used to store any and all of the program instructions, measurement data, and results as desired.

In this embodiment of the invention, signals obtained from such diverse sources as seismic surveys, well logs, monitoring of well production parameters, gravitational and magnetic surveys, and the like, are stored in digital form on disk storage device 30 in non-object-oriented, vendor-proprietary, arrangements as will be described in detail hereinbelow. System computer 22 can then retrieve the appropriate data from disk storage device 30 to perform the desired analysis, according to program instructions corresponding to one of multiple analysis application programs that interface with an abstract data model applied to the object-oriented databases, which will also be described in detail hereinbelow. For operation on system computer 22, the program instructions are written in the form of computer programs (e.g., in C++ or in any other object-oriented language) stored in computer-readable memory, such as program disk storage device 31 of FIG. 2; of course, the memory medium storing the computer program may be of any conventional type used for the storage of computer programs, including hard disk drives, floppy disks, CD-ROM disks, magnetic tape, and the like.

According to the preferred embodiment of the invention, system computer 22 presents output primarily onto graphics display 27, or alternatively via printer 28; further in the alternative, system computer 22 may store the results of the analysis described hereinbelow on disk storage 29, for later use and further analysis. Keyboard 26 and pointing device 25 (e.g., a mouse, trackball, or the like) are provided with system computer 22 to enable interactive operation. As noted, system computer 22 is able to communicate with disk storage devices 29, 30, 31, including external hard disk storage on a network and floppy disk drives. System 2 is typically located at a data center remote from survey regions, well locations, and the like.

Figure 3:
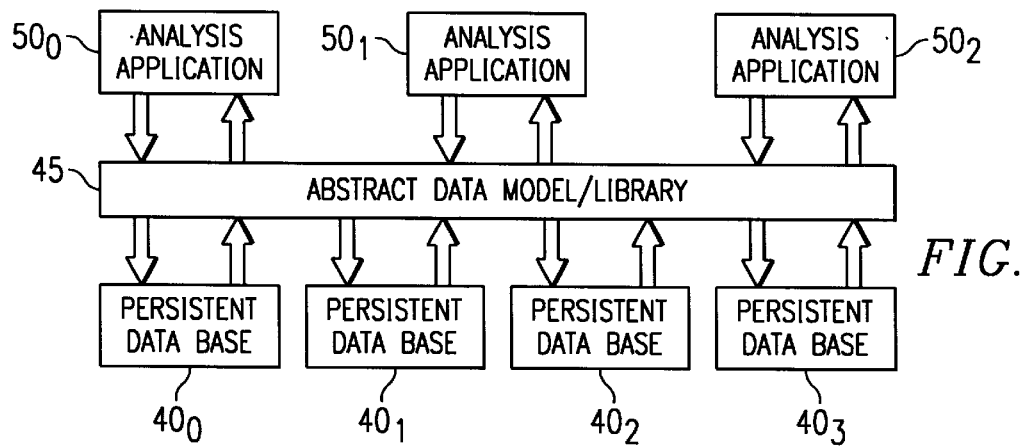
FIG. 3 is an illustration of the interrelationship of databases according to the preferred embodiment of the invention.

Referring now to FIG. 3, an arrangement of databases and application programs according to the preferred embodiment of the invention will now be described in detail. According to the preferred embodiment of the invention, multiple persistent databases $40_0$ through $40_3$ correspond to data received by computer system 2 of FIG. 2 from conventional data gathering tools and computer programs, provided from a plurality of vendors, and arranged according to specific formats for those data. In computer system 2 of FIG. 2, persistent databases $40_0$ through $40_3$ are preferably stored in disk storage device 30, and are available for update or appending of new data from their corresponding source. Examples of persistent databases $40_0$ through $40_3$ include well logs, lithology logs from wellbores, seismic survey data from 2D and 3D surveys, reservoir production data, and other information useful in the oil and gas industry for exploration and production of hydrocarbon reservoirs. In addition, multiple formats may be available for similar data that is acquired and stored in multiple vendor-specific ways. For example, 3D seismic traces may be stored according to the well-known SEGY format, and also may be stored according to one or more proprietary formats. According to the preferred embodiment of the invention, each such format will define a new persistent database 40.

As shown in FIG. 3, multiple analysis application programs $50_0$ through $50_2$ are available for use by system computer 22 in computer system 2. Analysis application programs $50_0$ through $50_2$ are typically stored in program disk storage device 31, of computer system 2 described hereinabove, and are analysis programs used by geologists and geophysicists for analyzing the contents of one or more of persistent databases $40_0$ through $40_3$. Analysis application programs $50_0$ through $50_2$ perform conventional functions, and as such contain conventional analysis routines; as will be described in further detail hereinbelow, however, their interface to persistent databases $40_0$ through $40_3$ correspond to an object-oriented interface according to the preferred embodiment of the invention.

As illustrated in FIG. 3, analysis application programs $50_0$ through $50_2$ communicate with persistent databases $40_0$ through $40_3$ by way of abstract data model and library 45. Abstract data model and library 45 is an object-oriented indexing system by way of which data in persistent databases $40_0$ through $40_3$ are retrievable by any one of analysis application programs $50_0$ through $50_2$ without requiring translation of the data in the accessed persistent database 40 into a format understandable by the accessing analysis application program 50. The absence of translation not only makes the data of all of persistent databases $40_0$ through $40_3$ available to all of analysis application programs $50_0$ through $50_2$, but also eliminates the need for multiple copies of the contents of persistent databases $40_0$ through $40_3$, which reduces the load on data storage device 30 and also eliminates the overhead associated with maintaining coherency among the various translated copies. In addition, as evident from FIG. 3, the addition of a new source of data (e.g., a new persistent database $40_4$), or a new analysis tool (e.g., a new analysis application program $50_3$) will not require generation of any translation programs, but only will require updating of certain objects in abstract data model and library 45.

As is known in the object-oriented art, "objects" are encapsulated quanta of data and programs (referred to as "structures" and "functions", respectively) that respond to messages sent by a higher-level program. The encapsulation of the objects means that the contents and format of the object cannot (and should not) be viewed or changed by the higher-level program; instead, all necessary use and operation of the objects are performed by the messages. The "members" of each object (i.e., its contents) may thus be data members or function members.

As is also known in the object-oriented art, objects are typically arranged in a hierarchical manner, in classes. Some classes (i.e., super-classes) may be inclusive of lower-level classes (i.e., subclasses), while other classes may stand alone. For those classes which are in a hierarchy of super-classes and subclasses, each object will respond to messages for its class (including data and function messages), and will also respond to those messages associated with its super-classes (i.e., those classes of which the class is a subclass). In this way, subclasses are said to "inherit" data member types and function member types of its super-classes. An object-oriented arrangement can often be analyzed by way of an "inheritance tree", which illustrates the relationship of the various classes of objects used in the design.

Figure 4:
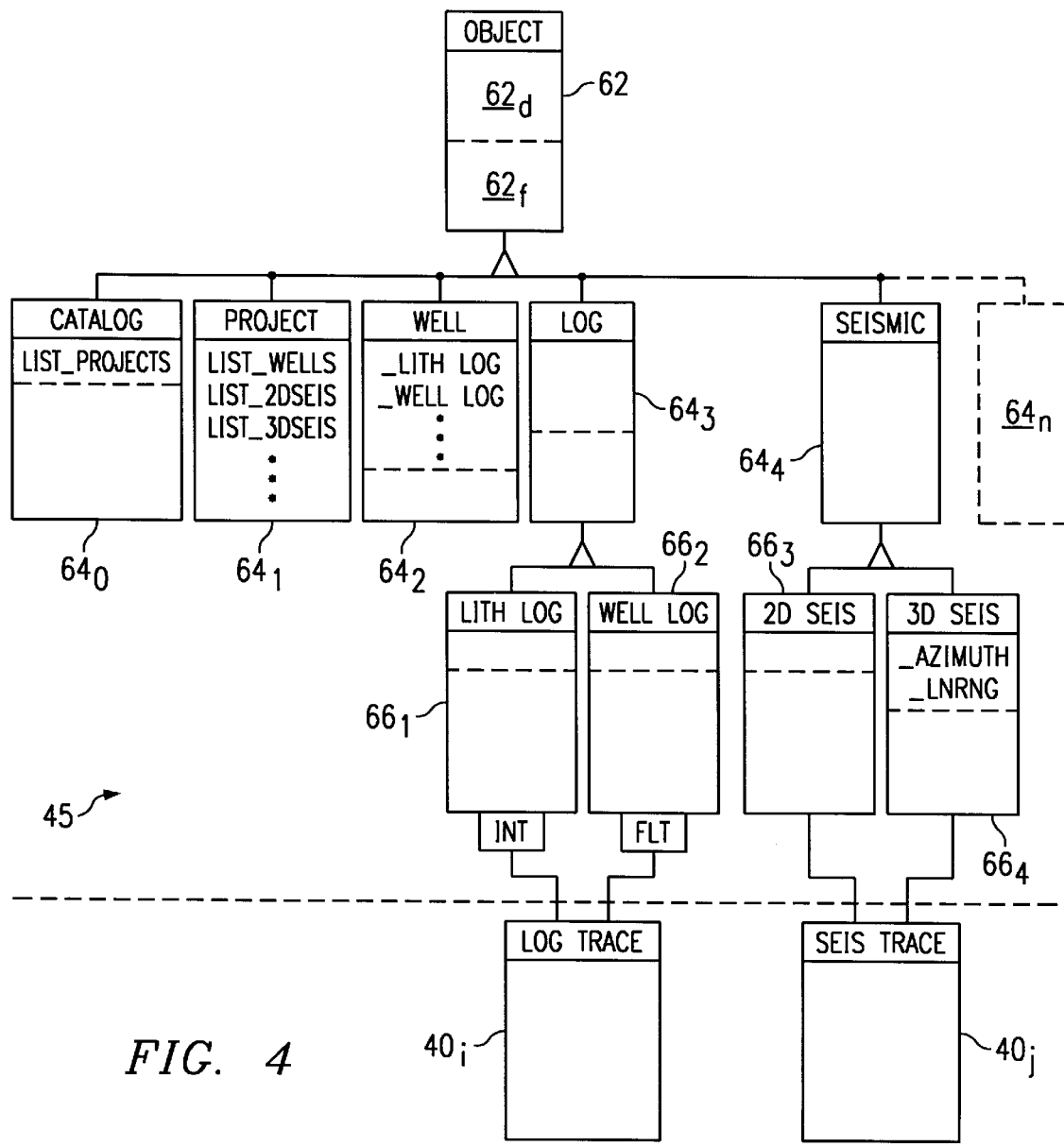
FIG. 4 is an inheritance tree diagram of an example of a hierarchical class structure for databases according to the preferred embodiment of the invention.

Referring now to FIG. 4, an example of an inheritance tree used by computer system 2 for the object-oriented arrangement of FIG. 3, according to the preferred embodiment of the invention, will now be described in detail. As will be evident from the following example, data from persistent databases $40_0$ through $40_3$ of different types are included within the same inheritance tree according to the present invention, despite their underlying format and structure being different, and generated by different vendors and tools. The benefits of abstract data model and library 45 in allowing access to these persistent databases $40_0$ through $40_3$ of different types will thus become apparent.

As shown in the inheritance tree of FIG. 4, highest class 62 is simply referred to as "object". Class 62 indicates that each object in any accessed class has, in common, certain data members 62d and function members 62f, such that certain rudimentary elements are present for each object. For example, data members 62d and function members 62f may include the following elements, where data members 62d are preceded by an underscore:

| OBJECT |
|---|
| _name |
| _family |
| _parent |
| _modified |
| handleMsg |
| read |
| write |
| destroy |
| name |
| setName |
| home |
| family |
| isModified |

In this example, therefore, each object, in any class, has a name, a family, a parent, and a flag to indicate if its contents are modified; similarly, each object, in any class, can return its name (function "name"), receive a new name (function "setName"), handle messages (function "handleMsg"), be read, written, destroyed, be associated with a home or family, and have its modified flag set (by the functions with the self-explanatory names). These function members may include virtual functions which refer to actual functions in other subclasses, including subclasses derived from object class 62 as will be described hereinbelow. Those objects which include virtual function members may be referred to as "abstract" objects, while those objects which do not include virtual function members may be referred to as "concrete" objects.

In the inheritance tree of FIG. 4 according to this example of the preferred embodiment of the invention, a next class level 64 include various types of objects of class 62. Each of classes $64_0$ through $64_n$ as shown in FIG. 4 also includes data members (64d) and function members (64f) which differ from one another (within class 64) but which are in addition to data members 62d and function members 62f from highest class 62. Classes $64_0$ through $64_n$ may have their own subclasses, as will now be described. The particular arrangement of classes $64_0$ through $64_n$ relate to the type of data to be analyzed by analysis application programs $50_0$ through $50_2$ of FIG. 3.

Class $64_0$ is a "catalog" class. Each object of class $64_0$ has a data member that includes "list_projects", which is a list of "projects", and as such refers to the members of class $64_1$.

As will be described hereinbelow, each object that is a member of class $64_0$ may thus be associated with one or more members of class $64_1$, as listed in its data member list_projects. Class $64_0$ also includes a number of function members, including the following:

| CATALOG |
|---|
| list_projects |
| handleMsg |
| read |
| write |
| destroy |
| projectCount |
| projectNames |
| selectProject |
| releaseData |

The function members $64_0$f of class $64_0$ thus include such operations as retrieving a count and the names of its associated projects (functions "projectCount" and "projectNames", respectively), along with the function of selecting a project and releasing data, as evident above.

Class $64_1$, as noted above, is the class of objects referred to as "projects". As shown in FIG. 4, each object of class $64_1$ refers to one or more wells, one or more 2D seismic surveys, and one or more 3D seismic surveys. Accordingly, the data members and function members of each object of class $64_1$ according to this example are as follows:

| PROJECT |
|---|
| list_wells |
| list_2Dseismic |
| list_3Dseismic |
| handleMsg |
| read |
| write |
| destroy |
| wellCount |
| 2DseismicCount |
| 3DseismicCount |
| wellNames |
| 2DseismicNames |
| 3DseismicNames |
| selectWell |
| select2Dseismic |
| select3Dseismic |
| releaseData |

As evident from the foregoing, the function members of each object of class $64_1$ include the ability to return the count and names of its associated wells and surveys, and also to select wells and surveys, in response to messages sent thereto.

As indicated in FIG. 4, class $64_2$ refers to "well" objects. Each well object of class $64_2$ refers, of course, to data from a particular oil or gas well; as shown in FIG. 4, lithology logs and well logs may be associated with a particular well. Accordingly, the data members $64_2$d and function members $64_2$f of the well objects of class $64_2$ in this example are as follows:

| WELL |
|---|
| _lithologyLogs |
| _wellLogs |
| _datum |
| _depth |
| handleMsg |
| read |

-continued

| WELL |
| --- |
| write |
| destroy |
| lithLogCount |
| wellLogCount |
| lithLogNames |
| wellLogNames |
| selectLithLog |
| selectWellLog |
| createLithLog |
| createWellLog |
| datum |
| depth |

As evident from this description, each well object of class $64_2$ also has data members indicating its datum point (kelly or surface) and its depth from the datum; function members are available to set the datum and depth, as indicated. Operations regarding the count, names, selection, and creation of logs are also provided, as indicated above for this class.

Class $64_3$ refers to the superclass of logs. As noted above, lithology logs and well logs are both data members of well class $64_2$; accordingly, as illustrated in FIG. 4, log class $64_3$ includes subclasses $66_1$, $66_2$ pertaining to lithology logs and well logs, respectively. Log class $64_3$ thus includes data members and function members that are common to all logs, as listed below for this example:

| LOG |
| --- |
| _type |
| _bits |
| _format |
| _depthUnit |
| _valueUnit |
| _description |
| _rfElevDescription |
| _refElev |
| _top |
| _bottom |
| _minValue |
| _maxValue |
| _sampleIncrment |
| handleMsg |
| read |
| write |
| destroy |
| numberSamples |
| resample |
| releaseData |
| minValue |
| maxValue |
| sampleIncrement |
| top |
| bottom |
| setType |
| getType |

As evident from the foregoing description, the data members and function members include typical well log information (and the corresponding ability to set the same, by way of the function members), including the type of log, the units of its data (in depth and value), criteria regarding the nature of the data, including the top and bottom depths, the minimum and maximum values, and the sample increment. These data members and function members are, as noted above, common to both lithology and well logs.

Subclass $66_1$ is the lithology log class, while subclass $66_2$ is the well log class. In this example, the data members and function members of each of subclasses $66_1$ and $66_2$ happen to coincide with one another. However, since it is useful according to the preferred embodiment of the invention to refer to lithology logs for some uses, and well logs for others, separate subclasses $66_1$, $66_2$ are maintained. The descriptions of subclasses $66_1$ and $66_2$ according to this example are as follows:

| LITHOLOGY LOG | WELL LOG |
| --- | --- |
| _data | _data |
| handleMsg | handleMsg |
| read | read |
| write | write |
| destroy | destroy |
| resample | resample |
| releaseData | releaseData |
| operatorIndex | operatorIndex |
| data | data |
| setNull | setNull |
| numberSamples | numberSamples |
| setData | setData |

As indicated hereinabove, each of object subclasses $66_1$, $66_2$ include data members corresponding to the actual data of the corresponding logs, as well as function members corresponding to the particular logs. Each of subclasses $66_1$, $66_2$ have an effective subclass of the log traces, as stored in persistent database $40_i$ in this example.

According to the preferred embodiment of the present invention, each of objects in classes 62, 64, 66 are abstract objects, in that each may include a virtual function and that each of these objects interface to analysis application programs 50. As will be described in further detail hereinbelow, however, the abstract objects of classes 62, 64, 66 are "instantiated" as a result of the instantiation of a "concrete" object that retrieves and operates upon data stored in one of persistent databases 40. When instantiated, each abstract object may include vendor-specific function members that are executed and communicate with its associated persistent database 40; however, analysis application programs 50 are able to "call" such a function member by way of the corresponding abstract object function member, such that the vendor-specific code is executed transparently relative to the analysis application program.

The log traces in persistent database $40_i$ include logs of both the lithology and well log type, and as such each of subclasses $66_1$, $66_2$ include persistent database $40_i$ as a further subclass. However, as noted above, each log trace in persistent database $40_i$ having integer values corresponds to a lithology log, and each log trace in persistent database $40_i$ having floating-point values corresponds to a conventional well log.

According to this preferred embodiment of the invention, the actual data corresponding to the log traces are stored in persistent database $40_i$, but are readable and writable in an object-oriented manner. In other words, the actual log traces are maintained in their native format, encapsulated (for purposes of analysis application programs $50_0$ through $50_2$ and abstract data model and library 45) as objects. Accordingly, as shown in FIG. 4, persistent database $40_i$ has data members and function members arranged as follows:

| LOG TRACE |
| --- |
| _unit |
| _memory |
| _numberSamples |

-continued

| LOG TRACE |
| --- |
| _nullValue |
| unit |
| setUnit |
| size |
| setSize |

Of particular note relative to this arrangement of log trace objects for persistent database $40_i$ is the data element "_memory" which, of course, indicates the address of the particular trace within data disk storage device 30, along with function element "size" which, when initiated, returns the size of the data block in disk storage device 30 occupied by this log trace. As typical for log traces, the particular unit of measure, number of samples, and null value are useful data elements (and, in the case of the unit of measure, may be set by a function element).

According to this preferred embodiment of the invention, therefore, specific data are stored in persistent databases $40_0$ through $40_3$ as objects, for use by analysis application programs $50_0$ through $50_2$ but without requiring either data translation or visibility into the data storage objects.

Referring again to FIG. 4, persistent databases $40_0$ through $40_3$ may include data of widely diverse type and source as objects, available to analysis application programs $50_0$ through $50_2$ in similar manner as the logs of persistent database $40_i$. In the example of FIG. 4, and as noted above relative to project class $64_1$, seismic survey object class $64_4$ is included to provide access to 2D and 3D seismic survey signals.

Similarly as log class $64_3$, seismic survey object class $64_4$ has subclasses $66_3$, $66_4$ associated therewith. As such, seismic survey object class $64_4$ includes data members and function members that are common to surveys of both types, summarized as follows:

| SEISMIC |
| --- |
| _samplesPerTrace |
| _numberSamples |
| _sampleRate |
| _startTime |
| _shotpointRange |
| _cdpRange |
| _datum |
| handleMsg |
| read |
| write |
| destroy |
| releaseData |
| samplesPerTrace |
| numberTraces |
| sampleRate |
| startTime |
| shotpointRange |
| cdpRange |
| datum |

As noted above, the data members and function members correspond to typical information regarding seismic traces, including their temporal, locational, and sampling parameters.

Subclasses $66_3$, $66_4$ pertain to 2D and 3D seismic traces, respectively. Accordingly, many of the function members are common, particularly those relative to the reading, writing, and other management of the traces. However, the 3D seismic traces in subclass $66_4$ include other data members pertaining to the azimuth and line range parameters for a particular shot, and function members pertaining to sections, slices, and cross-sections of the 3D survey (which, of course, are inapplicable to 2D seismic surveys). The data members and function members of subclasses $66_3$, $66_4$ in this example are defined as follows:

| 2D SEISMIC | 3D SEISMIC |
| --- | --- |
|  | _azimuth |
|  | _lineRange |
| handleMsg | handleMsg |
| read | read |
| write | write |
| destroy | destroy |
| getData | getTrace |
|  | putTrace |
|  | getData |
|  | getSection |
|  | getXsection |
|  | getSlice |

Each of subclasses $66_3$, $66_4$, in this exemplary embodiment of the invention, are abstract objects that, when instantiated, index into objects contained in persistent database $40_j$ that store data and function members pertaining to the actual seismic traces themselves. In addition, each of the objects in subclasses $66_3$, $66_4$ may include function members that, upon instantiation, include vendor-specific code used to perform the corresponding abstract function. As in the case of log traces in persistent database $40_i$, persistent database $40_j$ stores data for the seismic traces in an encapsulated form, unavailable to analysis application programs $50_0$ through $50_2$ that may be accessing persistent database $40_j$ via abstract data model and library 45. Both of subclasses $66_3$, $66_4$ are permitted to index into the same objects in persistent database $40_j$, since the same seismic trace may be used in generating 2D or 3D seismic surveys.

According to this preferred embodiment of the invention, each seismic trace is stored in object-oriented form in persistent database $40_j$ in association with the following data members and function members:

| SEISMIC TRACE |
| --- |
| _trace |
| _shotpoint |
| _cdp |
| _line |
| _header_data |
| _trace_data |
| trace |
| shotpoint |
| cdp |
| line |
| data |

The information stored as the data members and made available by function members in each object of persistent database $40_j$ are thus conventional in the art for seismic traces.

As illustrated in FIG. 4, other classes 64 and associated subclasses may also be made available, within the generic class of objects 62 available to analysis application programs $50_0$ through $50_2$ in the arrangement of FIG. 3. Such other classes 64 will, of course, include the particular type of information associated with their source.

While persistent databases $40_i$ and $40_j$ are shown in FIG. 4 as associated in one-to-one fashion with the log trace objects and seismic trace objects, respectively, it is of course to be understood that others of persistent databases $40_0$ through $40_3$ may be used to store similar information. For example, multiple ones of persistent databases $40_0$ through $40_3$ may store seismic trace data, in different internal (i.e., encapsulated) formats, such as ASCII, IESX, and various and multiple proprietary formats. In each format, however, the data members and function members described hereinabove will be applied to each seismic trace object. Because of the encapsulation of the data within the objects according to the preferred embodiment of the invention, the source and internal format of the data in persistent databases $40_0$ through $40_3$ is transparent to analysis application programs $50_0$ through $50_2$.

As described hereinabove, certain ones of the subclasses refer to one another, in a hierarchical fashion that differs from the inheritance tree of FIG. 4. For example, the projects of class $64_1$ refer to wells of class $64_2$ (e.g., by way of the list_wells data member); of course, wells are not a subclass of projects, both in fact and according to the inheritance tree (considering that the data elements of project class $64_1$ are not applicable to the data elements of well class $64_2$). This alternative hierarchy describes the relationship of the various objects in abstract data model and library 45 as used, as will now be described relative to the instantiation tree of FIG. 5.

Figure 5:
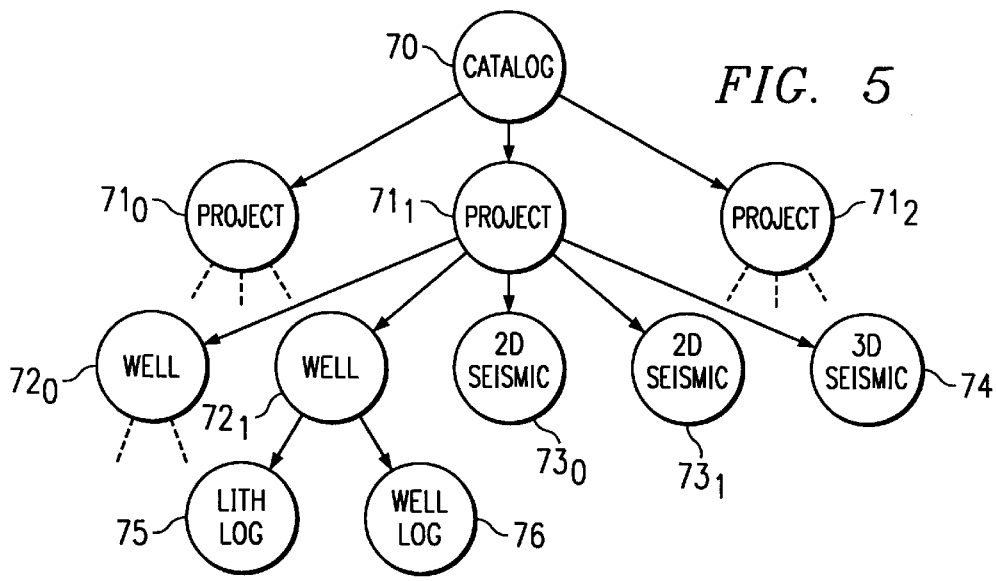
FIG. 5 is an instantiation tree diagram corresponding to the hierarchical class structure for databases according to the preferred embodiment of the invention.

FIG. 5 illustrates the logical hierarchy of the classes of objects of abstract data model and library 45 previously described relative to FIG. 4, in their instantiated relationship. According to the preferred embodiment of the invention, objects are instantiated as concrete objects, meaning that they have data members that index into the corresponding persistent database 40, and that they may include function members written according to vendor-specific code associated with the corresponding persistent database 40. Upon instantiation, however, each object also receives the abstract data and function members of its corresponding class in abstract data model and library 45, along with the abstract data and function members of its super-classes (i.e., objects of higher hierarchy, as indicated in the inheritance tree of FIG. 4). To the extent that virtual function members are present in any of the instantiated objects, these virtual function members will point to the function member in the concrete instantiated class, which will typically contain the vendor-specific code.

Referring to FIG. 5, the highest level object in the instantiation tree is catalog 70. As described hereinabove relative to FIG. 4, each catalog object 70 includes the data member list_projects, and as such the instantiation (i.e., retrieval or use) of catalog object 70 also permits the instantiation of one or more project objects $71_0$ through $71_2$, as shown in FIG. 5. The particular ones of project objects $71_0$ through $71_2$ that are instantiated are determined by the particular analysis application program 50, as will be described hereinbelow.

Each project object 71 in turn refers to one or more well objects 72, 2D seismic objects 73, and 3D seismic objects 74, as indicated by the data members list_wells, list_2Dseismic, and list_3Dseismic contained within each project object 71. For example, as shown in FIG. 5, instantiated project object $71_1$ has also instantiated well objects $72_0$, $72_1$, 2D seismic objects $73_0$, $73_1$, and 3D seismic object 74; the other project objects 71 may have more or fewer similar instantiated objects associated therewith, as desired. Each well object 72 will also have one or more lithology log objects 75 and well log objects 76 associated therewith, as illustrated in connection with well $72_1$ of FIG. 5. Each of the lowest level objects in the instantiation tree of FIG. 5 indexes into one or more objects in persistent databases $40_0$ through $40_3$ containing the actual data to be used by the calling one of analysis application programs $50_0$ through $50_2$.

According to the preferred embodiment of the invention, instantiation of a lower hierarchy concrete object will, in turn, effect instantiation of the corresponding object level and all of its super-classes. In FIG. 5, for example, instantiation of a 2D seismic object $73_0$ will instantiate a concrete 2D seismic object which is combined with the abstract data members and function members of class $66_3$ (see the inheritance tree of FIG. 4) to return abstract 2D seismic object $73_0$. In turn, an abstract project object $71_1$ of class $64_1$ and an abstract catalog object 70 of class $64_0$ will also be instantiated, each of which are abstract objects of class 62.

By way of the abstract data model and library 45 as illustrated in FIGS. 4 and 5, therefore, the access provided to analysis application programs $50_0$ through $50_2$ allows for information to be retrieved, analyzed, modified, and saved in a fashion that does not require (and preferably does not have) knowledge of the specific format of the data, its acquisition, and storage in persistent databases $40_0$ through $40_3$. In particular, analysis application program 50 can interface directly with any one of the instantiated abstract objects, through the use of the abstract object function members. When the abstract object function members are virtual functions, execution of vendor-specific code contained within the concrete portion of the instantiated object will take place to perform the desired abstract function. However, the execution of vendor-specific code will be transparent to analysis application program 50, as it need only refer to the abstract function member to effect the operation.

An example of an abstract object interface used in combination with one of analysis application programs $50_0$ through $50_2$ in performing analysis of data stored in multiple ones of persistent databases $40_0$ through $40_3$ according to the preferred embodiment of the invention will now be described. In this example, persistent database $40_A$ will correspond to a database of project data originating from a data acquisition program from a first vendor A, and persistent database $40_B$ will correspond to a similar database of project data, but originating from a data acquisition program from a second vendor B. As will be described in detail hereinbelow, because of the dissimilar origins of persistent databases $40_A$, $40_B$, different concrete read and write routines may be used in the writing of data into the persistent databases $40_A$, $40_B$. However, analysis application program 50 need only call for execution of read or write abstract object function members.

Also in this example, the project data from persistent databases $40_A$, $40_B$ pertain to a common geographical (and geological) survey region, for which a human interpreter wishes to analyze by way of an analysis application program 50. As will be evident from the following description, abstract data model and library 45 will contain an abstract object interface that allows analysis application program 50 to operate upon abstract catalogs, projects, and other objects as described hereinabove, such that processing, display, editing, and other interactions may be performed upon data supplied from various persistent databases $40_A$, $40_B$ without requiring knowledge of the underlying origin or destination of the data contained within the abstract objects.

According to this example, an abstract object interface may be defined as part of abstract data model and library 45, in the C++ programming language, as including objects, catalogs, and projects as described hereinabove. This exemplary object interface defines object class 62 (referring to the inheritance tree of FIG. 4) as follows (the double slash "//" indicating comments in the C++ code, as known in the art):

```
//
// definition of Object class
//
class Object {
protected:
    Object* __parent;
    char* __name
public:
    Object (char *name, Object *parent);  // constructor function prototype
    virtual ~Object();                     // destructor function prototype
    char *name(return__name);              // obtain object's name
    void setName (char *name);             // (re)set object's name
    virtual int read() = 0;                // must be defined in concrete
                                           // class
    virtual int write() = 0;               // must be defined in concrete
                                           // class
}
```

As is well known in the art of C++ programming, constructor and destructor functions are used to initialize and release, respectively, the memory resources utilized by each object. In this example, the constructor and destructor functions that implement object class 62 are defined hereinabove are as follows:

```
//
// implementation of Object class
//
//constructor. . .
Object : : Object (char *name, Object * parent)
        :__name(0),__parent(0)              // initializes values to zero
{
    __name = strdup (name);                 // duplicate the string containing the object
                                            // name and keep the copy in "__name"
    __parent = parent:                      // keep the pointer to parent object
}
// destructor. . .
Object : : ~Object()
{
    delete []__name;                        // free the memory associated with "__name"
}
```

As noted above, virtual functions may be defined in the definition of the object class 62 as noted above; such virtual functions (e.g., read and write) exist at the object class 62 to receive read and write directives from the analysis application program 50, but will in turn refer to the actual functions (e.g., read and write) as defined in the "concrete" classes that are instantiated (i.e., the vendor specific classes as will be noted hereinbelow) rather than in the abstract classes (such as object class 62). Actual functions that are operable upon the abstract objects, such as the "setName" function noted hereinabove in the definition of object class 62, may also be implemented in the abstract object interface as desired. An example of the setName function in the C++ programming language is as follows:

```
// a member function of Object class (an example) is "setName"
void
Object : : setName (char *name)
{
    delete []__name;                 // deletes prior__name
    __name = strdup(name);           // sets__name to its new value
}
```

As described hereinabove, catalog class $64_0$ constitutes a type of object that is a member of object class 62, but may have additional data and function members. In this exemplary abstract object interface, a C++ implementation of the definition of catalog class $64_0$, as abstract objects (i.e., not as vendor-specific catalogs) may be as follows:

```
//
//definition of Catalog class
//
class Catalog: public Object               //a catalog is a kind
                                           // of Object,
                                           //and inherits all of
                                           //Object's features
{
protected:
    List<Project *>__projects;             //maintain a list of
                                           // projects in the catalog
public:
    Catalog (char *name, Object *parent=0);  //constructor function
                                             // prototype
    ~Catalog();                              //destructor function
                                             // prototype
    virtual int read() =0;
    virtual int write () =0;
    virtual int projectCount() {return__projects.count():}
    virtual List<char*> *projectNames ();
    virtual Project *selectProject (int i);  // return i^{th} project in List
};
```

As noted above relative to FIG. 4, each catalog class $64_0$ refers to a list of projects (by way of function member list__projects of FIG. 4, which corresponds to the virtual function List<char*>*projectNames ( ) defined above). As such, the constructing of each instance of a catalog class 64 is relatively simple, and involves merely the initializing of a catalog as an object, as follows:

```
//
//implementation of Catalog class
//
// constructor
Catalog : : Catalog(char *name, Object *parent)
        :Object (name, parent)  //initializes Object component of Catalog,
{}                              // nothing else to do
```

Because catalog class $64_0$ constitutes a list of objects of the project class $64_1$, exemplary implementation of the destructor for class $64_0$ defined as described in the above example may include the following:

```
// destructor
Catalog : : ~Catalog()                  // empty the list of projects
                                        in Catalog
{
        Project *project=_projects.first();   //begin with first project
                                              in Catalog
        while (project != 0) {          //so long as projects
                                        remain
                delete project;         //free memory from cur-
                                        rent
                                        project
                project=_projects.next();  //increment to next
                                        project
        }
}
```

The implementation of catalog class $64_0$ thus refers to its associated projects $64_1$, and thus this example of catalog class $64_0$ includes the various function members that are implemented as follows:

```
List<char*>*
Catalog : : projectNames()              //return a List* of project
                                        names
{
        List *list = new List;          //reserve memory for the
                                        List
        Project *project =_projects.first();  //begin with first project in
                                              Catalog
        while (project != 0) {          //so long as projects
                                        remain
                list->insert(project->name());  //append current
                                                project
                                                //(which is also an
                                                object)
                project =_projects.next();  //increment to next
                                            project
        }
        return list;
{
Project*
Catalog : : selectProject (int i);      //select project "i"
                                        from the catalog
{
        Project*project = =_projects[i];  //select i^th project from
                                          the List
        project-> read();               //have i^th project read itself
                                        // (using its read function
                                        member)
        return project;
}
```

The above exemplary definitions and implementation of the objects of classes 62, $64_0$, $64_1$, in the abstract object interface of this example refer only to the abstract functionality of object class 62 and catalog class $64_0$, with the existence of project class $64_1$ derived therefrom. Of course, other abstract classes may be similarly defined and indirectly defined, according to the needs of the particular analysis application programs 50. In this example, the abstract classes 62, $64_0$, $64_1$ are virtual, and abstract, objects, as evident from their virtual functions (e.g., read, write, etc.), and thus cannot be instantiated without reference to so-called "concrete" classes of objects that are actually instantiated. In effect, classes 62, $64_0$, $64_1$ correspond to an "Abstract Factory", as described in Gamma, et al., *Design Patterns: Elements of Reusable Object-Oriented Software*, (Addison-Wesley, 1995), pp. 87–95, incorporated herein by reference. This abstract factor is a design pattern according to which abstract object classes create other abstract object classes. The underlying implementation of the created class (e.g., project class $64_1$) is unknown to the analysis application program 50 utilizing the abstract object interface; instead, only the abstract nature of the created class, which is project class $64_1$ in this example, need be handled by analysis application program 50.

As noted above, concrete (i.e., non-virtual) classes must be created to provide actual data and function members that are used to instantiate the corresponding abstract object classes (e.g., object class 62, catalog class $64_0$). According to this example, concrete catalog classes $64'_0$ will be defined, from which the abstract classes (object class 62, catalog class $64_0$, project class $64_1$) may be instantiated, and within which concrete function members can access the vendor-specific persistent databases $40_A$, $40_B$. For example, the following code (in C++) may be used to define a concrete vendor A catalog class $64'_{OA}$:

```
//
// Vendor A Catalog definition
//
class VendorA_Catalog : public Catalog    //a VendorA_Catalog
                                          is a Catalog
{
protected:
public:
        VendorA_Catalog(char*, Object*);  //prototype constructor
                                          function
        ~VendorA_Catalog();               //prototype destructor
                                          function
        int read();                       //prototype "concrete" read
                                          function
        int write();                      //prototype "concrete"
                                          write function
};
```
Implementation of the concrete vendor A catalog class $64'_{OA}$ may be accomplished as follows:
```
//
//Vendor A Catalog implementation
//
VendorA_Catalog : : VendorA_Catalog (char *name, Object *parent)
        : Catalog (name, parent)          //initializes "Catalog"
                                          portion of object
{
}
VendorA_Catalog : : ~VendorA_Catalog()    //permits Catalog to
                                          delete_projects
{}
VendorA_Catalog : : read ()               //this is a Vendor A-specific
                                          read function
{
        //open Vendor A persistent database $40_A$ with its own program
        ABC_OpenDatabase();
        //read projects from Vendor A persistent database $40_A$
        char *project_name = ABC_GetProjectName ();  //set project
                                                     name
        while (project_name != 0) {       //so long as
                                          projects remain
                Project *project = new VendorA_Project(project_name,
        this);
                _projects.append(project);    //append
                                              projects
                                              to catalog
                project_name = ABC_GetProjectName();  //get next
                                                      project name
        }
        if (_projects.count() == 0)       //if no projects
                return 1;                 //send error
                                          flag
        return 0;                         //else send no
                                          error flag
}
```

A concrete vendor B catalog class $64'_{OB}$ is defined by C++ code in this example similarly as in the case of the concrete vendor A catalog class $64'_{OA}$, as follows:

```
//
// Vendor B Catalog definition
//
class VendorB_Catalog : public Catalog      //a VendorB_Catalog
                                              is a Catalog
{
protected:
public:
    VendorB_Catalog(char *, Object *);      //prototype constructor
                                              function
    ~VendorB_Catalog();                     //prototype destructor
                                              function
    int read();                             //prototype "concrete" read
                                              function
    int write();                            //prototype "concrete"
                                              write function
};
```

However, because concrete vendor B catalog class $64'_{OB}$ refers to persistent database $40_B$ from a different vendor B, its implementation may differ to account for differences in the read function member and other functions. An exemplary C++ implementation of concrete vendor B catalog class $64'_{OB}$ may thus be constructed according to the following example:

```
//
//Vendor B Catalog implementation
//
VendorB_Catalog : : VendorB_Catalog (char *name, Object *parent)
        : Catalog (name, parent)         //initializes "Catalog"
                                           portion of object
{
}
VendorB_Catalog : : ~VendorB_Catalog()   //permits Catalog to
                                           delete _projects
{}
VendorB_Catalog : : read ()              //this is a Vendor B-specific
                                           read function
{
    //connect to Vendor B persistent database 40_B with its own
    program XYZ_CreateConnection();
    //read projects from Vendor B persistent database 40_B
    char *project_name = XYZ_FirstProjectName ();   //set project
                                                      name
    while (project_name != 0) {                     //so long as
                                                      projects
                                                      remain
        Project *project = new VendorB_Project(project_name,
this);
        _projects.append(project);                  //append
                                                      projects
                                                      to catalog
        project_name = XYZ_NextProjectName();       //get next
                                                      project name
    }
    if (_projects.count() == 0)                     //if no
                                                      projects
        return 1;                                   //send error
                                                      flag
    return 0;                                       //else send
                                                      no error flag
}
```

As evident from a comparison of these exemplary implementations of the read function members for concrete vendor A catalog class $64'_{OA}$ and concrete vendor B catalog class $64'_{OB}$, the read functions involve completely different function calls (e.g., ABC_GetProjectName( ) versus XYZ_NextProjectName( ), for incrementing to the next project in the respective database). These different function calls depend upon the functionality supplied by the particular vendor with its corresponding persistent database 40.

According to the preferred embodiment of the invention, however, as evidenced by this example, the abstract object interface of abstract data model and library 45 permits analysis application programs 50 to operate simply upon abstract catalog classes $64_O$, rather than directly upon concrete vendor A catalog class $64'_{OA}$ and upon concrete vendor B catalog class $64'_{OB}$. The identity of a particular concrete vendor catalog class $64'_O$ need only be known at a single point in time in the execution of analysis application program 50, prior to instantiation of the abstract classes 62, $64_O$, $64_1$, when the user specifies the ones of persistent databases 40 to be used. According to this embodiment of the invention, analysis application program 50 uses only the abstract objects after their instantiation, and need not again refer to the concrete, vendor specific, objects associated with persistent databases 40.

In addition, according to the preferred embodiment of the invention, many functions need only be implemented at the abstract object level, and need not be implemented in vendor-specific code. In the foregoing example, such functions include Catalog::selectProject (int i), and Catalog::projectNames( ). These function members of the abstract catalog class $64_O$ are adequate to perform the specified operations (i.e., select a project, and return a list of project names, respectively).

In some circumstances, however, vendor-specific code may be required to implement special handling for functions at the abstract class level. In this case, the implementation of a particular concrete class could specify a specific concrete function member that implements vendor-specific code that would be called by the virtual function member at the abstract object interface level. Examples of the implementation of such vendor-specific code are provided hereinabove relative to the read functions for each of the concrete vendor catalog classes $64'_{OA}$, $64'_{OB}$.

In addition, it is contemplated that some vendor-specific concrete classes may not require vendor-specific code, while others may so require such code. For example, a VendorX_Catalog::selectProject (int i) function member could be implemented in the concrete vendor catalog class $64'_{OX}$ where vendor-X-specific code is required to select a project. After instantiation, the execution of a Catalog::selectProject (i) function at the abstract class level would call vendor-specific VendorX_Catalog::selectProject (int i) function member if the catalog being manipulated was a vendor X catalog, or simply use the abstract Catalog::selectproject (i) function if the catalog being accessed corresponded to a catalog from another vendor other than vendor X.

Figure 6:
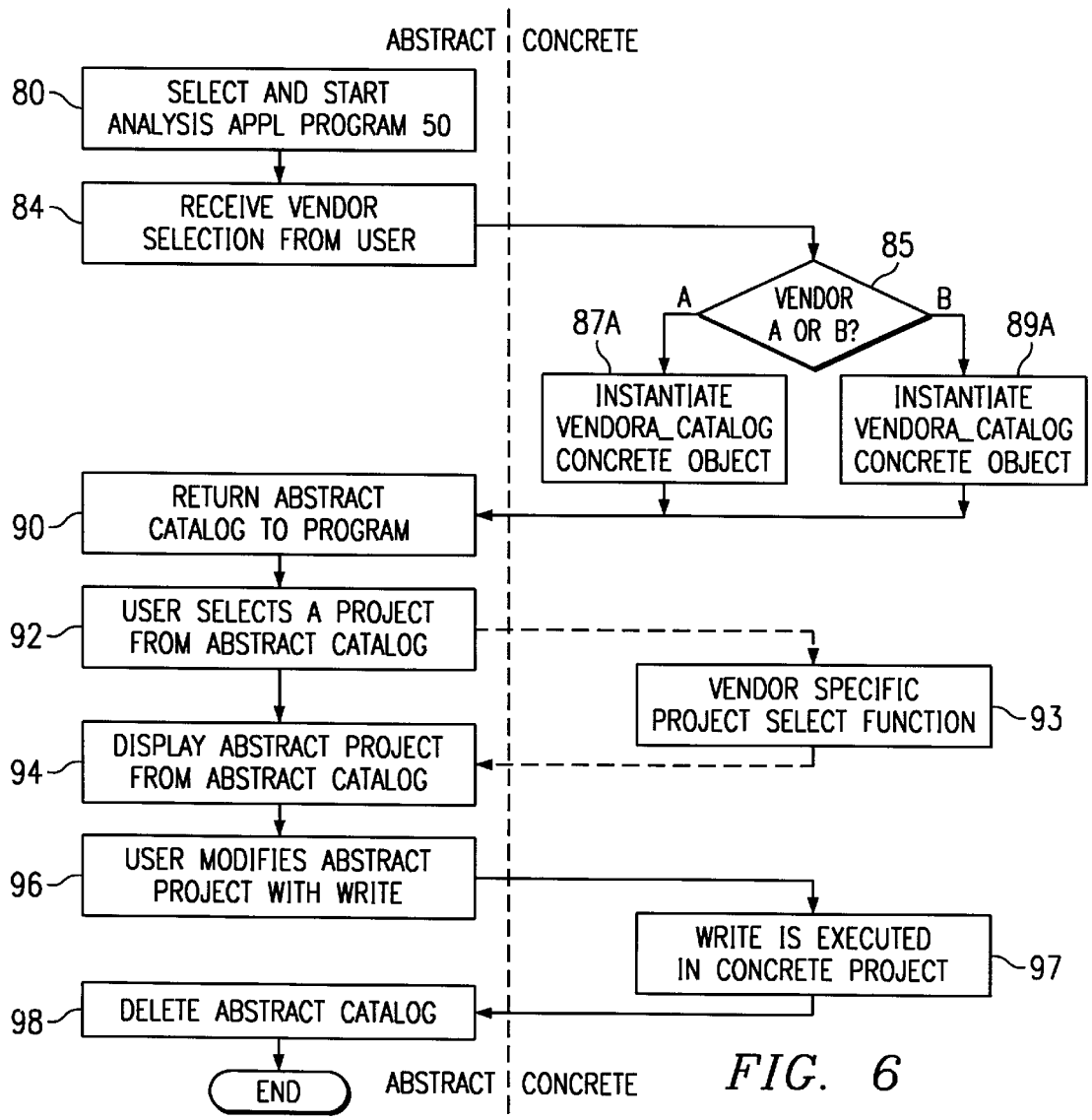
FIG. 6 is a flow chart illustrating the operation of an example of an analysis application program relative to the abstract object model according to the preferred embodiment of the invention.

Referring now to FIG. 6, a first example of the operation of computer system 2 of FIG. 2 in performing a typical function by analysis application program 50 under the control of a human user will now be described, for purposes of illustrating the abstract object interface of the preferred embodiment of the invention. FIG. 6 separately illustrates the processes that operate in the abstract "realm" and those that operate in the concrete "realm", to illustrate that analysis application programs 50 are only concerned with abstract objects (i.e., those in abstract data model and library 45 of FIG. 3), and that any vendor-specific operation is transparent to the analysis application program 50. The operation illustrated in FIG. 6 may be readily performed by system computer 22 within computer system 2 of FIG. 2, described hereinabove.

The operation begins with process 80 in which the user selects one of the available analysis application programs 50, and causes system computer 22 to start up the execution of the selected analysis application program 50. The startup portion of process 80 includes the execution of code corresponding to the definition of each of the appropriate objects, of both the abstract and concrete type, as described hereinabove relative to the inheritance tree of FIG. 4, for example by way of execution of the C++ programming code described in the foregoing example.

As described hereinabove, the instantiation of abstract objects to which the selected analysis application program 50 interfaces to perform its operations, such abstract objects including those in catalog class 62 and as project class $64_1$, requires the instantiation of concrete objects. As described hereinabove, the instantiation of such concrete objects may involve the execution of vendor specific code to access the appropriate ones of persistent databases 40. Accordingly, process 84 is next performed to prompt the user of analysis application program to select, in this example, either a vendor A or vendor B concrete catalog, so that instantiation of the abstract objects may proceed. Process 84 may be performed by providing a pull-down menu to the user upon graphics display 27, by way of which selection of the desired persistent database 40, or alternatively the vendor from which the data is to be retrieved, may readily be made by pointing device 25.

In response to results of process 84, system computer 22 next operates in the concrete realm to instantiate the desired concrete catalog. In decision 85, the vendor selection made by the user is interrogated, following which system computer 22 performs either process 87A or process 87B to instantiate either a vendor A concrete catalog object or a vendor B concrete catalog object. An example of C++ code that is contained within analysis application program 50 to accomplish process 84, decision 85, and processes 87A, 87B, is as follows:

```
Catalog *catalog;                          //instantiates abstract catalog 64₀
char c = prompt_user_for_database();       //this function returns
either 'a' or 'b'
                                           //depending upon the user input (process 84)
if (c =='a')
      catalog = new VendorA_Catalog("Vendor A",0);
                                           //instantiates Vendor A concrete catalog (87A)
else
      catalog = new VendorB_Catalog("Vendor B",0);
                                           //instantiates Vendor B concrete catalog (87B)
```

This operation of process 84, decision 85, and processes 87A, 87B is the only location of analysis application program 50 at which the identity of the vendor associated with the catalog concrete objects must be known. Following instantiation of the concrete catalog in process 87A or 87B (the instantiated catalog corresponding to catalog 70 in the instantiation tree of FIG. 5), vendor-specific code for performing functions upon the selected persistent database 40 may either be already included within function members of the concrete object, or may be called therefrom.

After instantiation of the concrete object, an abstract catalog object 70 is instantiated based upon the instantiated concrete catalog object, and is returned to analysis application program 50 in process 90. Typically, instantiation processes 87A, 87B, 90 are performed in response to the selection of the concrete type in process 84 and decision 85 by the executing code first building the abstract part of abstract catalog object 70 and then appending the concrete portion thereto, resulting in the complete abstract catalog object 70.

Upon instantiation of abstract catalog object 70, process 90 may then return a list of project names to the user, by way of a pull-down menu or a displayed list upon graphics display 27. An example of C++ code that is contained within analysis application program 50 for returning such a list is as follows:

```
List <char*> projectNames = catalog->projectNames();
for (int i = 0; i<catalog->projectCount();i++)   //for each project in the
                                                 catalog
      display(projectNames[i]);                  //display its project name
```

Instantiation of objects in other classes associated with the instantiated abstract catalog object 70 (e.g., referring to FIG. 5, projects 71, wells 72, and so on) will derive from the instantiated abstract catalog object 70 as needed.

Operation of analysis application program 50 may now begin. According to the preferred embodiment of the invention, analysis application program 50 fully interfaces to the contents of persistent database 40 through the abstract objects instantiated so far, without reference to the particular vendor type associated with the selected persistent database 40. In this example, process 92 is performed, by way of which the user selects a project from the catalog, based upon the project names returned with instantiated catalog object 70 and displayed in process 90. Process 92 need only work with abstract projects, and is unconcerned with the identity of the vendor-specific persistent databases 40 from which the actual data originated. As noted above, however, specific function members of the instantiated objects may be used to perform vendor specific operations as needed, as illustrated by process 93 in FIG. 6 which shows, as an option, that selection of a project by process 92 may call a vendor-specific function within the instantiated catalog object (70), which executes vendor-specific code to effect the selection. This execution of vendor specific code, contained within the concrete portion of the instantiated catalog object 70 itself, is transparent to the user. The selected object is then instantiated as an abstract object; in this example, referring to the instantiation tree of FIG. 5, a selected project $71_1$ from instantiated catalog 70 is instantiated by the selection of process 92 (and operation of process 93, if necessary), again without requiring knowledge of the vendor identity.

Once a project is selected in this example, system computer 22 displays the attributes of the selected project upon graphics display 27, in process 94. The user of analysis application program 50 may then modify the project in process 96. For example, the modification of process 96 may be made directly by entry of a value by the user, or in an automated fashion by processing performed by a function of analysis application program 50 (e.g., application of a filter to the project). The processing of process 96 is performed upon the abstract object, such as the selected instantiated project $71_1$. Following the desired processing upon the abstract object, the results are written back into the appropriate persistent database 40 by way of the appropriate write function, initiated by an abstract write in process 96. Since the instantiated concrete objects included function members with the necessary vendor-specific code for interfacing with the persistent databases, analysis application program 50 merely effects a virtual write to the abstract object; the abstract write function member for the object in turn calls the necessary write operation from the concrete object, which is then executed in process 97 in the concrete realm to actually effect a write to the appropriate one of persistent databases 40.

Following completion of the desired processing and writing of results in process 96, analysis application program 50 preferably clears the memory that was associated with the various abstract objects used in execution. This is accomplished in process 98, where the abstract classes, including the abstract catalog object 70 in class $64_0$, are cleared from memory. At this point, either analysis application program

50 may be used to process data from a different one of persistent databases 40, or alternatively a different analysis application program 50 may be started up and operated at this point.

An example of C++ code that is contained within analysis application program 50 for performing processes 92, 94, 96 and 98, to select, display, and modify a project (in this example, project number 2) is as follows:

```
//The following is selection process 92, in which the user selects project
#2
Project *project = catalog->selectProject(2);   //note that the vendor
                                                //(A or B) need not be
                                                //specified to select the
                                                //project
display (project->name())                       //display name of selected
                                                project
                                                //This is process 94.
//The following code for process 96 sets "newName" as the name of
selected project #2.
project->setName("newName");
project->write():                               //This executes the virtual write
                                                //function by calling the correct
                                                //write function implemented
                                                //in the concrete object.
delete catalog;                                 //This is process 98, deleting
                                                //the abstract catalog.
```

Other C++ functions and implementations may also be included in the operation of analysis application program, as will be apparent to those of ordinary skill in the art.

Figure 7:
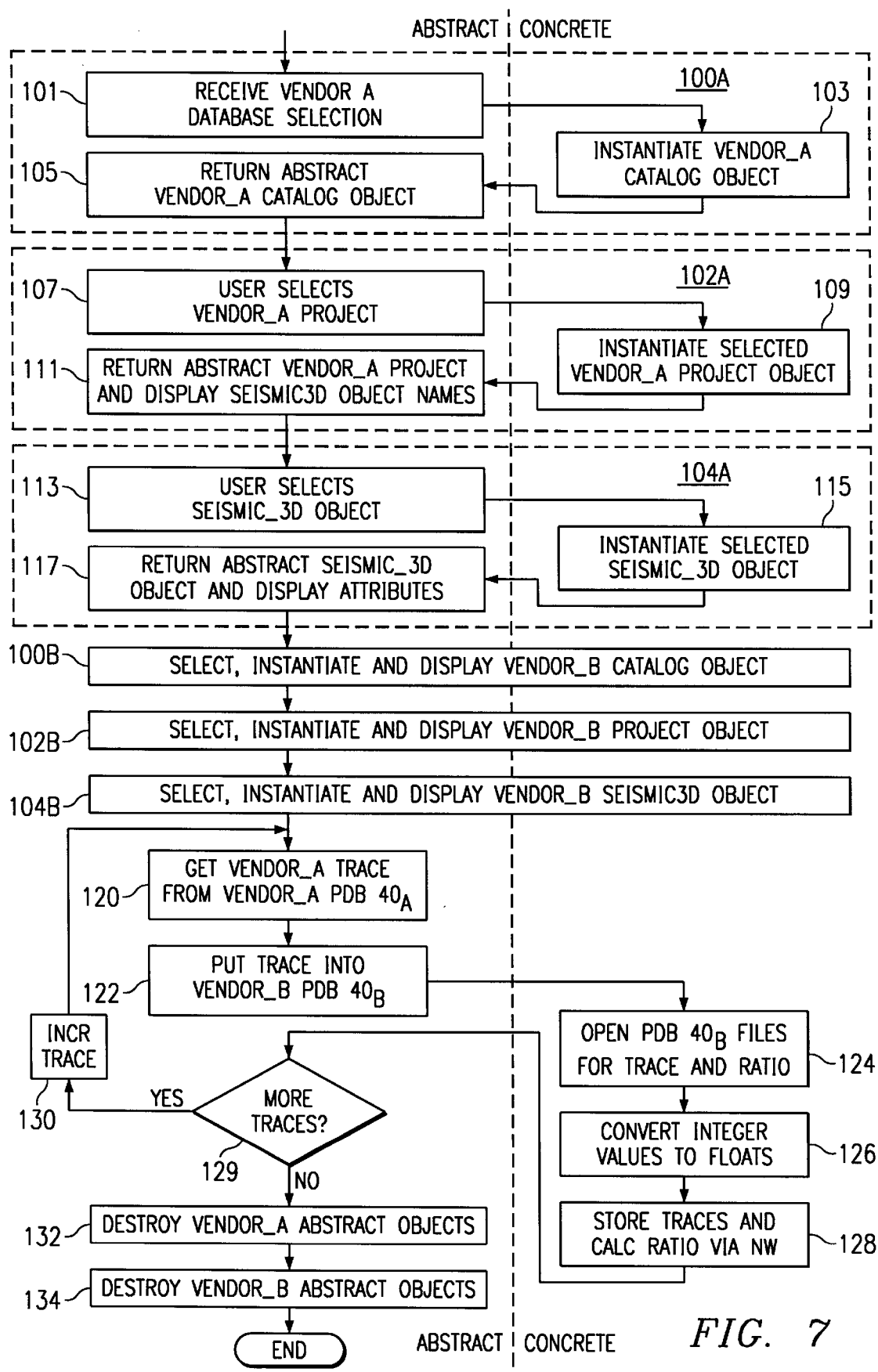
FIG. 7 is a flow chart illustrating the operation of a second example of an analysis application program relative to the abstract object model according to the preferred embodiment of the invention.

Referring now to FIG. 7, another example of the operation of computer system 2 of FIG. 2 in performing a typical function of another analysis application program 50 will now be described, for purposes of illustrating additional features of the abstract object interface of the preferred embodiment of the invention. The example of FIG. 7 illustrates the operation of retrieving a group of 3D seismic traces from a first persistent database $40_A$ stored in a specific vendor-specific format (the vendor for which is referred to herein as vendor A) and storing the retrieved traces into a second persistent database $40_B$ stored in a different vendor-specific format (the vendor for which is referred to herein as vendor B). As in the case of the example illustrated in FIG. 6, the selected analysis application program 50 interfaces with the persistent databases 40 by way of abstract model interface and library 45, specifically by way of abstract objects therein, without regard to or knowledge of the vendor-specific code and data storage format according to which the persistent databases operate. As in the example of FIG. 6, analysis application program 50 interfaces with the abstract objects in the abstract realm, while certain operations are performed transparently to the selected analysis application program 50 relative to concrete objects. Distinction between operations to abstract objects and operations to concrete objects is indicated in FIG. 7 by the boundary between the abstract and concrete "realms".

After the analysis application program 50 is selected and started up, the method of the example of FIG. 7 begins with process 101 in which system computer 22 receives a user selection indicating that persistent database $40_A$ for data stored in Vendor A-specific format is to be selected. In response to the selection of process 101, system computer 22 instantiates a concrete vendor_A catalog object, in similar manner as described hereinabove. Following the concrete instantiation of process 103, system computer 22 performs process 105 in which an abstract (vendor_A) catalog object is returned to analysis application program 50. As described above, analysis application program 50 is unaware of the vendor format for the abstract catalog object returned in process 105 (i.e., the abstract catalog object is simply a catalog object, and not a "vendor A" catalog). For purposes of this description, however, the abstract objects will be identified by their source in parentheses, it being understood that analysis application program 50 need not know, and cannot determine, the vendor-specific format for the object.

Typically, process 105 will display the contents of the abstract catalog, for example by displaying (or otherwise making available) a list of the projects associated with the catalog. As described hereinabove, the abstract (vendor_A) catalog object includes the instantiated concrete vendor_A object in combination with data members and function members to which analysis application program 50 can interface. Processes 101, 103, 105, in which a database is selected, and an abstract catalog object is returned following instantiation of an underlying concrete catalog object corresponding to vendor A persistent database $40_A$ are collectively referred to as process 100A.

Process 107 is next performed by system computer 22 executing analysis application program 50 to receive a user selection of one of the projects displayed for the abstract (vendor_A) catalog object returned in process 105. System computer 22 then performs process 109 to instantiate a concrete vendor_A project object (in the concrete realm), following which system computer 22 returns an abstract (vendor_A) project object based upon the concrete vendor_A project instantiated in process 109. In process 111, system computer 22 also displays a list of object names for constituent objects (e.g., seismic_3D objects) to which the recently instantiated and returned abstract (vendor_A) project indexes. Processes 107, 109, 111, by way of which a particular vendor_A project is selected, instantiated, and returned, are collectively referred to herein as process 102A.

System computer 22 next performs process 113, in which the executing analysis application program 50 receives a user input that selects one of the seismic_3D objects displayed in process 111. System computer 22 then performs process 115 to instantiate a concrete seismic_3D object based upon the selection received in process 113, following which an abstract seismic_3D object is returned in process 117. In this example, upon return of the abstract seismic_3D object, system computer 22 displays various attributes of the seismic_3D object, such as the number of horizons, the number of faults, the number of traces, common depth point identifiers, and the like. Processes 113, 115, 117 are collectively referred to herein as process 104A. The seismic_3D objects from vendor A-specific persistent database $40_A$ will represent the source of the traces to be copied into a second, destination, persistent database $40_B$ in this example, despite the format and operation of the second persistent database $40_B$ being significantly different from that of the first, source, persistent database $40_A$.

Similarly, system computer 22 performs process 100B to select, instantiate, and display a vendor_B catalog object, process 102B to select, instantiate, and display a vendor_B project object, and process 104B to select, instantiate, and display attributes of a vendor_B seismic_3D object. As indicated in FIG. 7, some of the operations, including at least the instantiation of concrete objects, are performed in the concrete "realm", to properly access persistent database $40_B$. However, analysis application program 50 need only consider abstract data member and function members, and as such the concrete operations are transparent to analysis application program 50. The nature and extent of the operations performed relative to the instantiation of concrete objects in processes 100B, 102B, 104B may differ significantly from those performed in processes 100A, 102A, 104A, since the persistent databases $40_A, 40_B$ may significantly differ in format and operation from one another. Analysis application program 50 is unconcerned with such differences, however, as any vendor-specific code required for instantiation of the concrete objects will be incorporated with the instantiation of higher level abstract objects, and will thus be readily executable as needed.

Following the selection and instantiation of the abstract (vendor__A) seismic__3D object in process 104A, and the selection and instantiation of the abstract (vendor__B) seismic__3D object in process 104B, execution of the retrieval and storage of traces may be performed. In process 120, system computer 22 selects an individual trace (e.g., corresponding to a loop index) from persistent database $40_A$ by executing a function member (e.g., GetTrace) contained within the instantiated vendor__A seismic__3D object. In this example, the GetTrace function member is an abstract level function that can be readily executed, using information regarding the memory location of the trace contained within the abstract (vendor__A) seismic__3D object, in which case no vendor-specific code is necessary to retrieve the trace corresponding to the current value of the loop index from persistent database $40_A$ and instantiate the retrieved trace as an abstract object.

Process 122 is next performed by system computer 22 to store the retrieved trace into persistent database $40_B$. This operation is initiated by system computer executing a Put-Trace function member of the abstract (vendor__B) seismic__3D object, referring to the newly instantiated abstract trace object from process 120 as an argument. In this example, however, the PutTrace function member includes vendor-specific code, which causes certain actions to be taken in the concrete "realm". This vendor-specific code is made available to system computer 22 via the abstract (vendor__B) seismic__3D object as discussed above. However, the existence and execution of this vendor-specific code is transparent to analysis application program 50; all that is required in analysis application program 50 is the execution of the PutTrace function member (an abstract and, in this case, virtual function) of the vendor__B seismic__3D object.

The vendor-specific code for storing the trace is illustrated by processes 124, 126, 128 of FIG. 7. Process 124 opens persistent database $40_B$, for example by opening a network socket and by performing an open file operation using a file specification contained in the concrete portion of the vendor__B seismic__3D object to open a trace file and a file for containing compression ratios. Process 126 is a data conversion process, for example by converting integer values (vendor A format) into floating-point values. Process 128 effects the storing of the converted data in the opened trace file, and calculating and storing the compression ratio in the compression ratio file. Of course, the particular concrete processes necessary will vary with the particular vendor types and formats used; processes 124, 126, 128 are illustrated only by way of example.

Upon completion of the PutTrace operation of processes 124, 126, 128, decision 129 is performed by system computer 22 to determine if additional traces remain to be retrieved and stored; if so, the loop index is incremented in process 130 to point to the next trace in sequence, and processes 120, 122 (and, transparently, 124, 126, 128) are repeated.

Upon completion of all traces (decision 129 is NO), cleanup of the abstract objects is effected, in conventional object-oriented programming fashion. In process 132, the abstract (vendor__A) objects are cleared from memory; similarly, abstract (vendor__B) objects are cleared from memory in process 134. As such, upon completion of the operation, the abstract objects are destroyed. Such destruction is useful not only to free up memory resources, but also to ensure memory coherency by maintaining only the persistent database copies of the data upon which operations are being performed.

Referring now to FIGS. 8 and 9a through 9f, another example of the operation of the method and system according to the preferred embodiment of the invention will now be described in detail. In this example, analysis application program 50 includes instructions that direct system computer 22 to display plots of traces, such as well log traces and seismic traces, upon graphics display 27. In particular, analysis application program 50 in this example is operable to simultaneously display such plots obtained from different ones of persistent databases 40. Because of the existence and use of abstract data model and library 45 according to the preferred embodiment of the present invention, such display may be performed without analysis application program 50 having knowledge of the particular data formats, and vendor-specific code for reading and displaying such plots, as analysis application program 50 can interface with any one of the persistent databases 40 at the abstract level.

Figure 8:
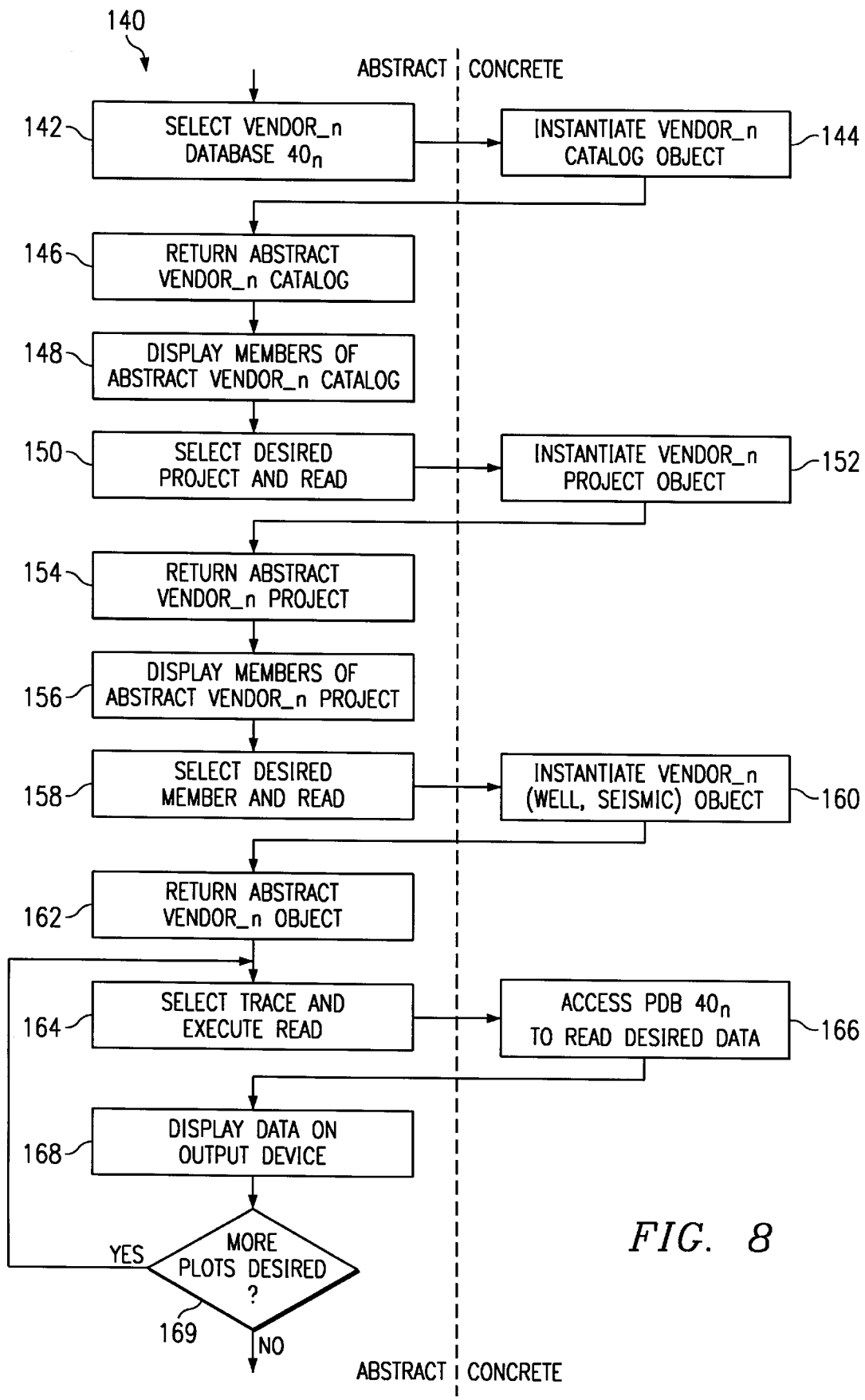
FIG. 8 is a flow chart illustrating the operation of a third example of an analysis application program relative to the abstract object model according to the preferred embodiment of the invention.

FIG. 8 is a flow chart of the operation of process 140, which instantiates the necessary objects for retrieval of one or more traces (including either or both well log traces and seismic survey traces), and for display of the retrieved cases, according to this example of the preferred embodiment of the invention. FIG. 8 includes an illustrated boundary between the abstract and concrete "realms" of operation, as in FIGS. 6 and 7 described hereinabove, to clearly illustrate which operations are performed at the abstract level. Process 140 illustrates such instantiation, retrieval and display for a single vendor type; it is to be understood from this description that process 140 may be repeated by system computer 22 under the control of analysis application program 50 to the extent desired by the human user.

Figure 9A:
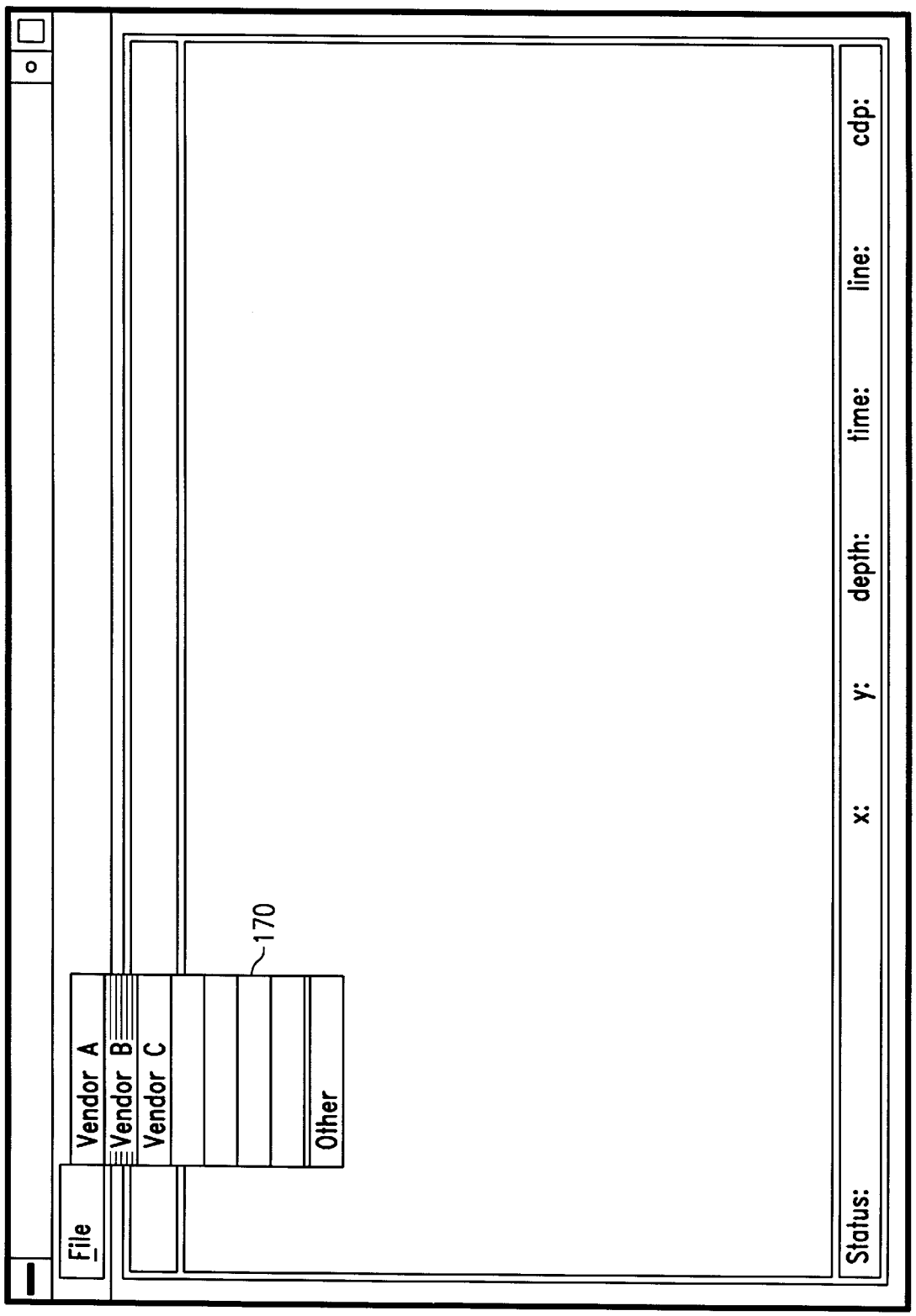
FIGS. 9a through 9f are graphics display screens at selected steps in the operation of the example of FIG. 8.

Process 140 begins with process 142, in which the user selects one of persistent databases 40 for access. As in the previously-described examples, the selection of a specific one of databases 40 is the only point in analysis application program 50 at which the identity of the vendor format is necessary. FIG. 9a illustrates an example of a computer display screen by way of which the user can select the persistent database 40 in process 142. As shown in FIG. 9a, pull-down menu 170 is displayable on graphics display 27 and lists the available persistent databases 40 by vendor for selection by the user using pointing device 25; FIG. 9a illustrates the example where the persistent database $40_B$ corresponding to "Vendor B" is selected. Process 140 is illustrated in generalized form in FIG. 8, and as such process 142 indicates the selection of "vendor__n" database $40_n$.

Following selection process 142, process 144 is performed by system computer 22 to instantiate a concrete catalog object corresponding to the selected persistent database $40_n$. As described above, instantiation of the concrete catalog object in process 144, in the concrete "realm", results in an abstract (vendor__n) catalog object being returned to analysis application program 50 in process 146. In this example, process 148 is then performed by system computer 22, to display the available members of the abstract (vendor__n) catalog object. Referring to FIGS. 4 and 5 described hereinabove, the data members of an abstract (vendor__n) catalog object according to the preferred embodiment of the present invention typically are all projects for which data are present in the selected persistent database $40_n$.

In process 150, the user selects one of the projects displayed in process 148 (by way of a pull-down menu, for example), and executes the "read" function member of the abstract (vendor__n) catalog object. As illustrated in FIG. 8, system computer 22 performs the read by execution of process 152 to instantiate a concrete vendor__n project object for the selected object; process 152 may be performed in vendor__n-specific code, if appropriate, as described hereinabove. The instantiation of the concrete vendor__n project object in process 152 is followed by process 154, in which system computer 22 instantiates and returns an abstract (vendor__n) project object to analysis application program 50. In this example, system computer 156 displays a list of the members of the abstract (vendor__n) project object corresponding to the project selected in process 150 upon graphics display 27, which the user may use to select the desired member in process 158. Referring to the description of project objects presented hereinabove relative to FIG. 4, data members of projects include 2D seismic surveys, 3D seismic surveys, and well logs.

Figure 9B:
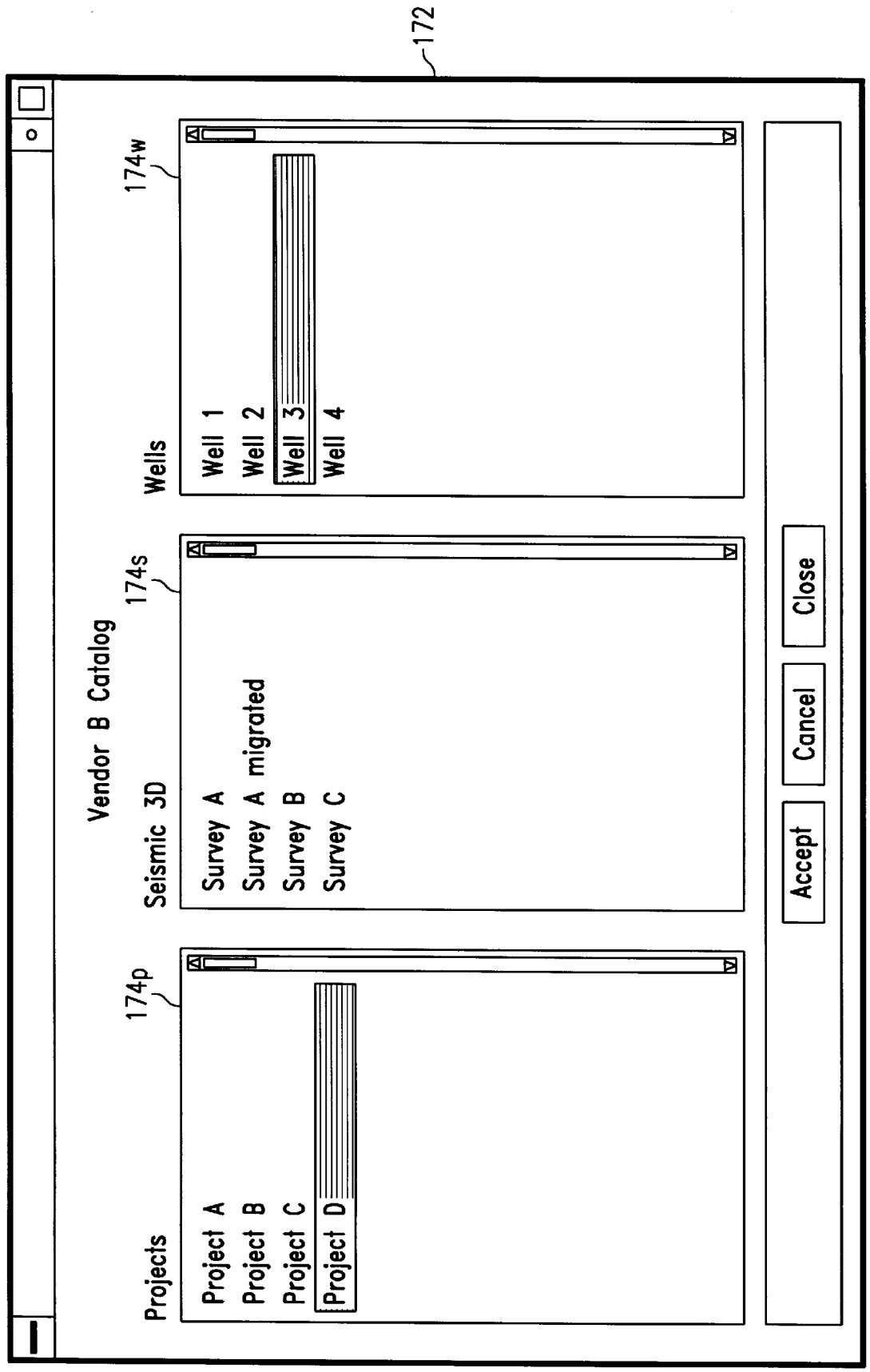

FIG. 9b illustrates display window 172 of graphics display 27 as process 158 is being performed, in this example. Window 172 is illustrative of the members of the abstract (vendor__B) catalog object, and its instantiated subclass objects, in response to the selection made in process 142 in the example illustrated in FIG. 9a. Display window 172 includes project display window 174p, in which each of the projects contained within the Vendor__B catalog, and indicates that "Project D" was selected and instantiated in processes 150, 152 in this example. Seismic3D display window 174s displays the 3D seismic survey members of selected Project D, and well display window 174w displays the well members of selected Project D. In process 158 in this example, the user has selected "Well 3" from Project D.

Referring back to FIG. 8, the desired member of the abstract (vendor__n) project object is selected in process 158, and the read function member of the vendor__n project object is executed. In response to the execution of the read function, system computer 22 performs process 160 to instantiate the selected member of the vendor__n project. In the example illustrated in FIG. 9b, a concrete object corresponding to "Well 3" of Project D of the Vendor__B catalog for persistent database $40_B$ is instantiated in process 160. An abstract object, corresponding to the selected member for which a concrete object was instantiated in process 160, is then instantiated in process 162, and returned to analysis application program 50.

Upon return of the abstract object corresponding to the well or survey member of the selected member of the current project, system computer 22 performs process 164 by way of which a trace is selected by the user for the member object. Upon selection of the desired trace, system computer 22 executes a read function member for the object. As described above relative to the other examples of the preferred embodiment of the invention, read functions and other function members of the abstract objects may or may not involve the execution of vendor-specific code to effect the read of data from persistent database $40_n$. Accessing of persistent database $40_n$ is performed in process 166, which takes place in the concrete "realm" when vendor-specific code is being executed. As described above, operations that may be performed by system computer 22 in process 166 may include the opening of a network socket, opening of a file, retrieval of data, and formatting of the data.

Upon completion of the retrieval of process 166, system computer 22 in this example displays a plot corresponding to the retrieved trace on graphics display 27, in process 168.

After such display, analysis application program 50 determines if any other traces or any other data for the particular member (well, 2D seismic, or 3D seismic) selected in process 158 is to be displayed, by; if so (decision 169 is YES), additional traces are selected and displayed by way of processes 164, 166, 168 in similar manner as the first.

Figure 9C:
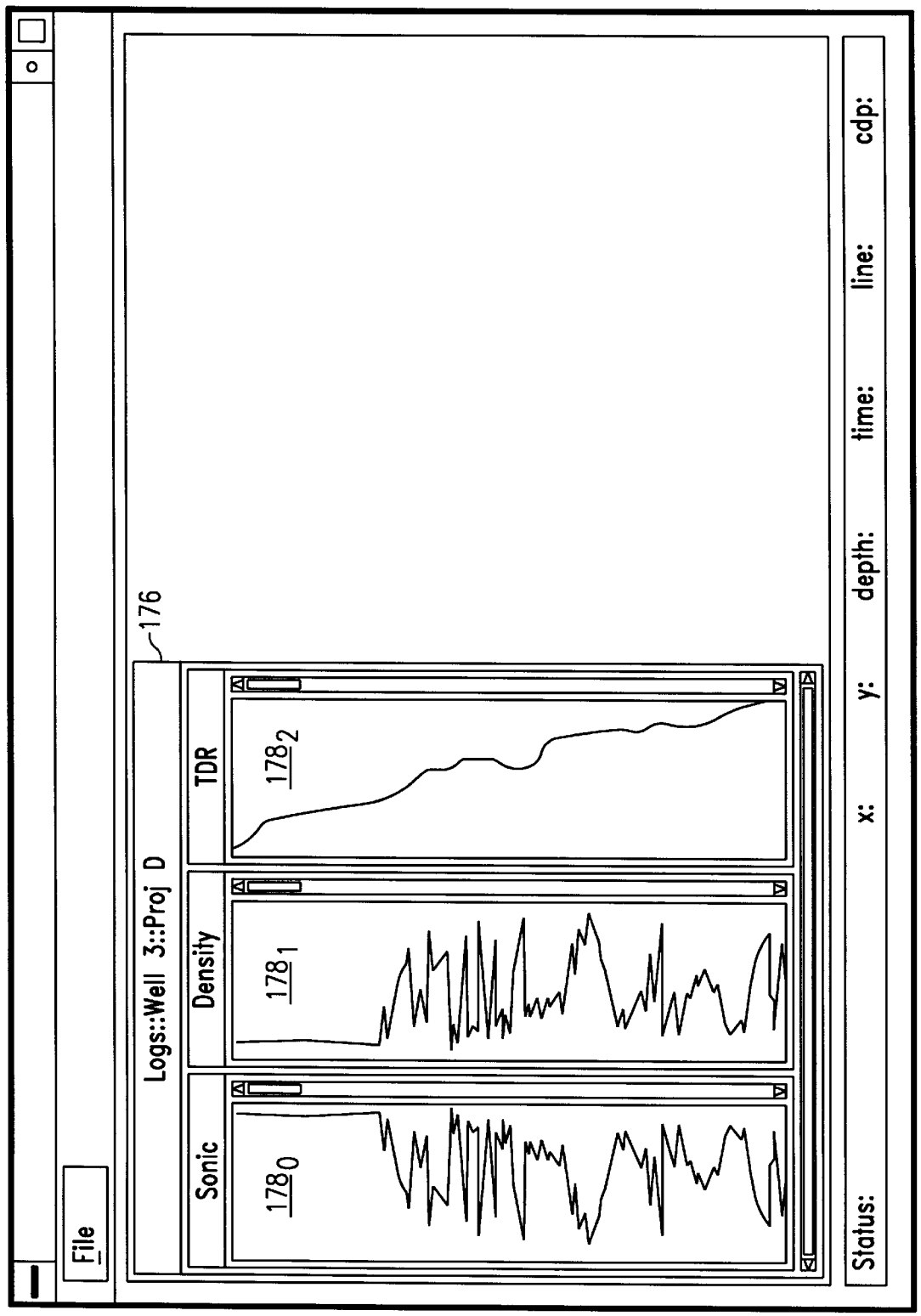

FIG. 9c illustrates display window 176 which is displaying multiple well log plots of various types as retrieved from "Well 3" selected in process 158 via window 174w in the example of FIG. 9b. In the example of FIG. 9c, subwindows $178_0$, $178_1$, $178_2$ are shown, each of which display a retrieved trace. For example, subwindow $178_0$ displays a sonic well log plot which was retrieved in a first pass through processes 164, 166, 168 for "Well 3" selected by way of the screen of FIG. 9b, subwindow $178_1$, displays a density well log plot also for "Well 3" obtained in a second pass through processes 164, 166, 168, and subwindow $178_2$ displays a TDR well log plot for "Well 3" obtained in a third pass through processes 164, 166, 168. Each of the well log plots displayed in FIG. 9c correspond to the same well, and were retrieved from the same persistent database $40_B$ selected from pull-down menu 170 of FIG. 9a, in process 142.

Upon completion of the desired retrieval and display for the current member (well or seismic survey), determined by decision 169 being NO, operations to be performed by analysis application program 50 in this pass through process 140 are complete. As discussed above, destruction of the abstract objects that were instantiated in this pass of process 140 may then be performed, to free memory if desired. Of course, if another well, seismic 2D, or seismic 3D within the currently instantiated project is desired to be plotted, or if another project within the currently instantiated catalog (i.e., the same persistent database $40_n$) is desired, portions of process 140 may be repeated beginning with the appropriate one of processes 150, 158 within the currently instantiated catalog or project, respectively.

In addition, the entirety of process 140 may be repeated, if desired, to obtain information from a different one of persistent databases 40 for simultaneous display with the plots already being displayed. This repetition of process 140 begins with process 142, as before, where the user selects another one of persistent databases 40.

Figure 9D:
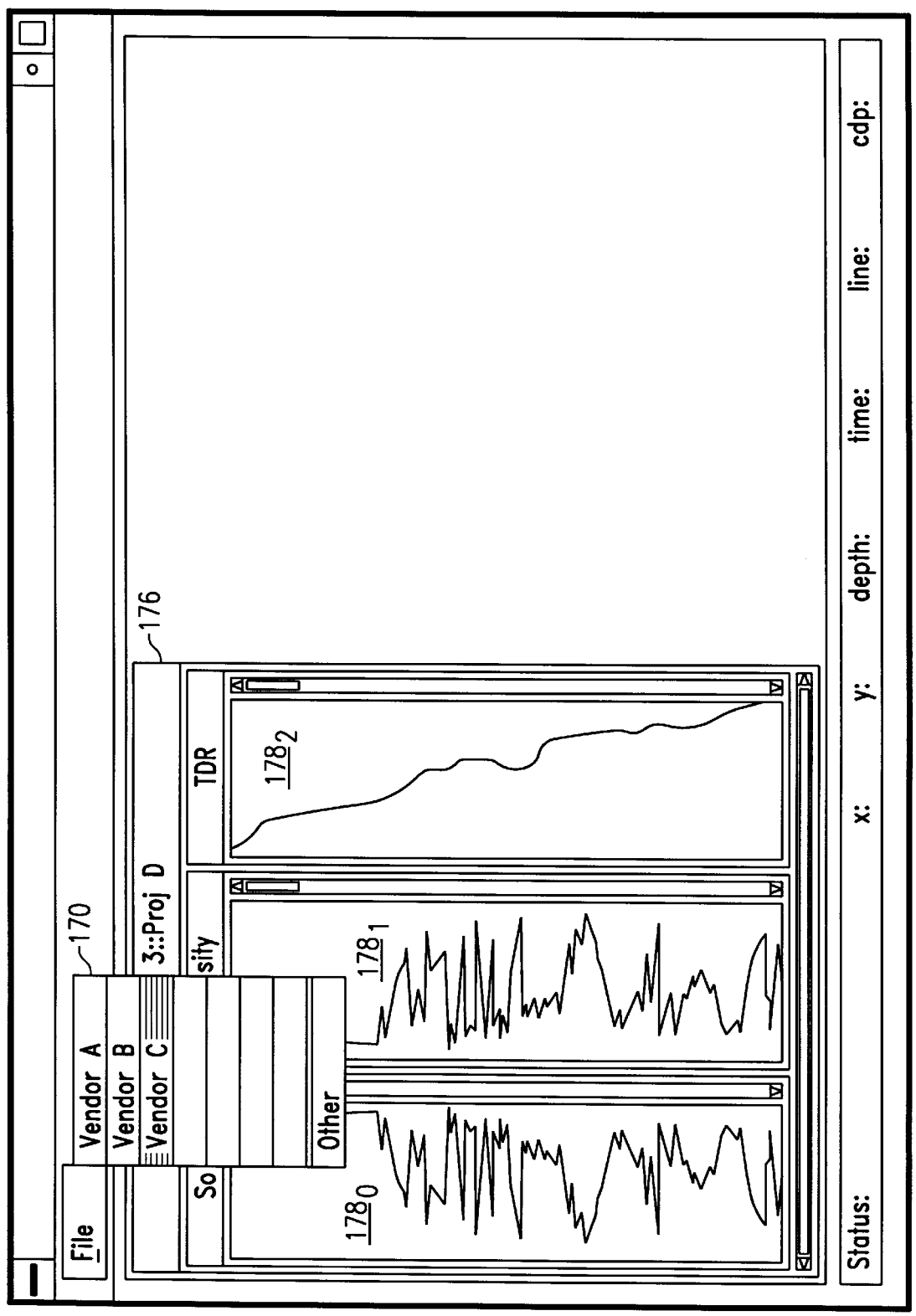

FIG. 9d illustrates an example of the display screen of graphics display 27 where the user has again accessed pull-down menu 170 to make another selection in process 142. In the example of FIG. 9d, selection of the Vendor C persistent database $40_C$ is being made. Accordingly, as will become apparent, graphics display 27 will be used to simultaneously display plots from different databases 40.

Figure 9E:
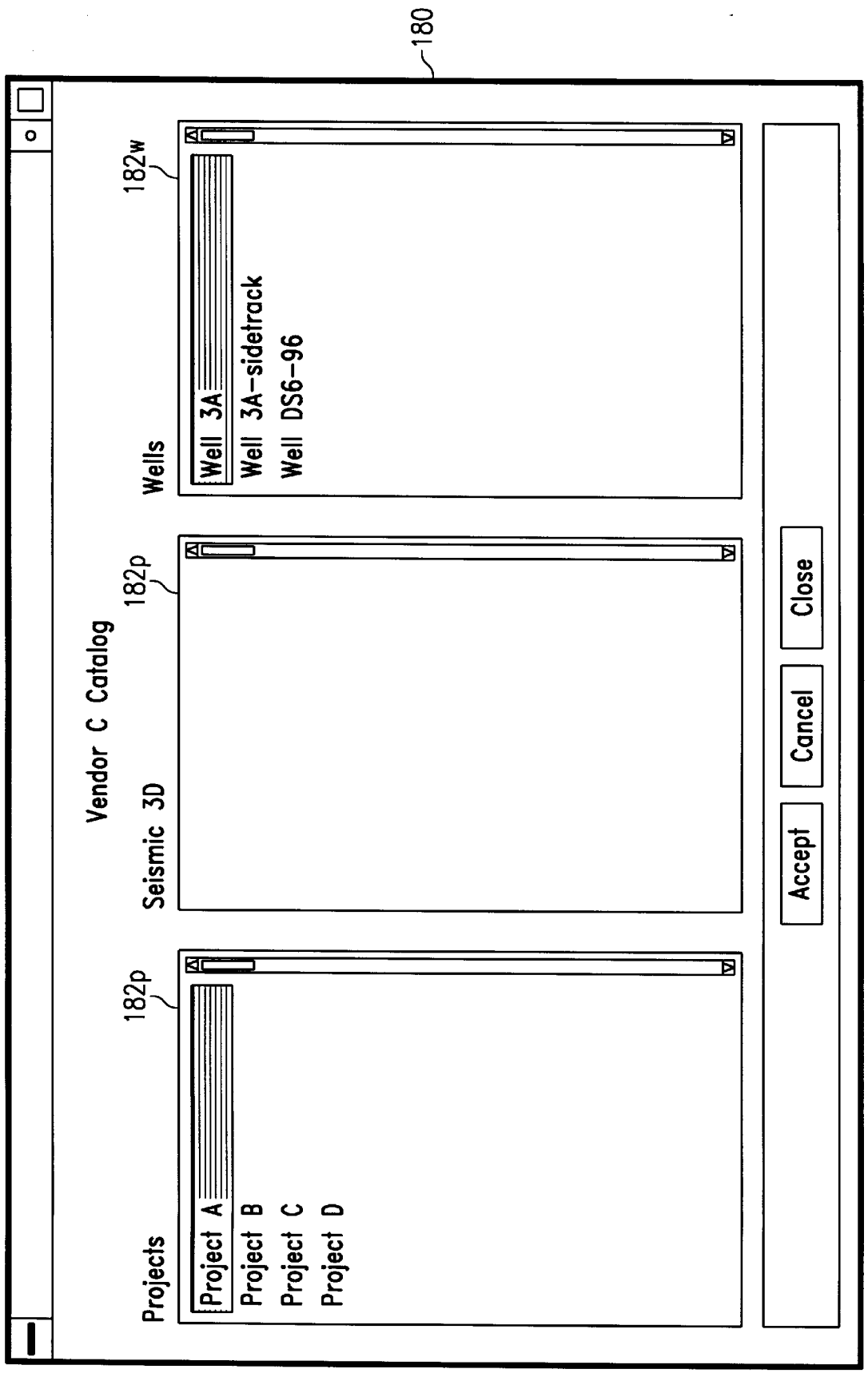

In the same manner as described above, process 140 is then performed in substantially the same manner as in the first pass described relative to FIGS. 9a through 9c, except that the concrete instantiation of objects and retrieval of data are made relative to persistent database $40_C$, which likely is arranged to a different format than persistent database $40_B$ to which access was made in the first pass. The selection, instantiation, and display processes are repeated as before; of course, vendor-C-specific code may be executed to perform the various operations, depending upon the requirements of persistent database $40_C$, but with such execution being transparent to analysis application program 50. FIG. 9e illustrates display window 180, in which the selections of "Project A" (in display window 182p) and "Well 3A" of "Project A" (in display window 182w) have been made by the user; display window 180 of FIG. 9e is displayed as a result of process 158, similarly as display window 172 of FIG. 9b. As evident from FIG. 9e, "Project A" does not have any seismic 3D members.

Figure 9F:
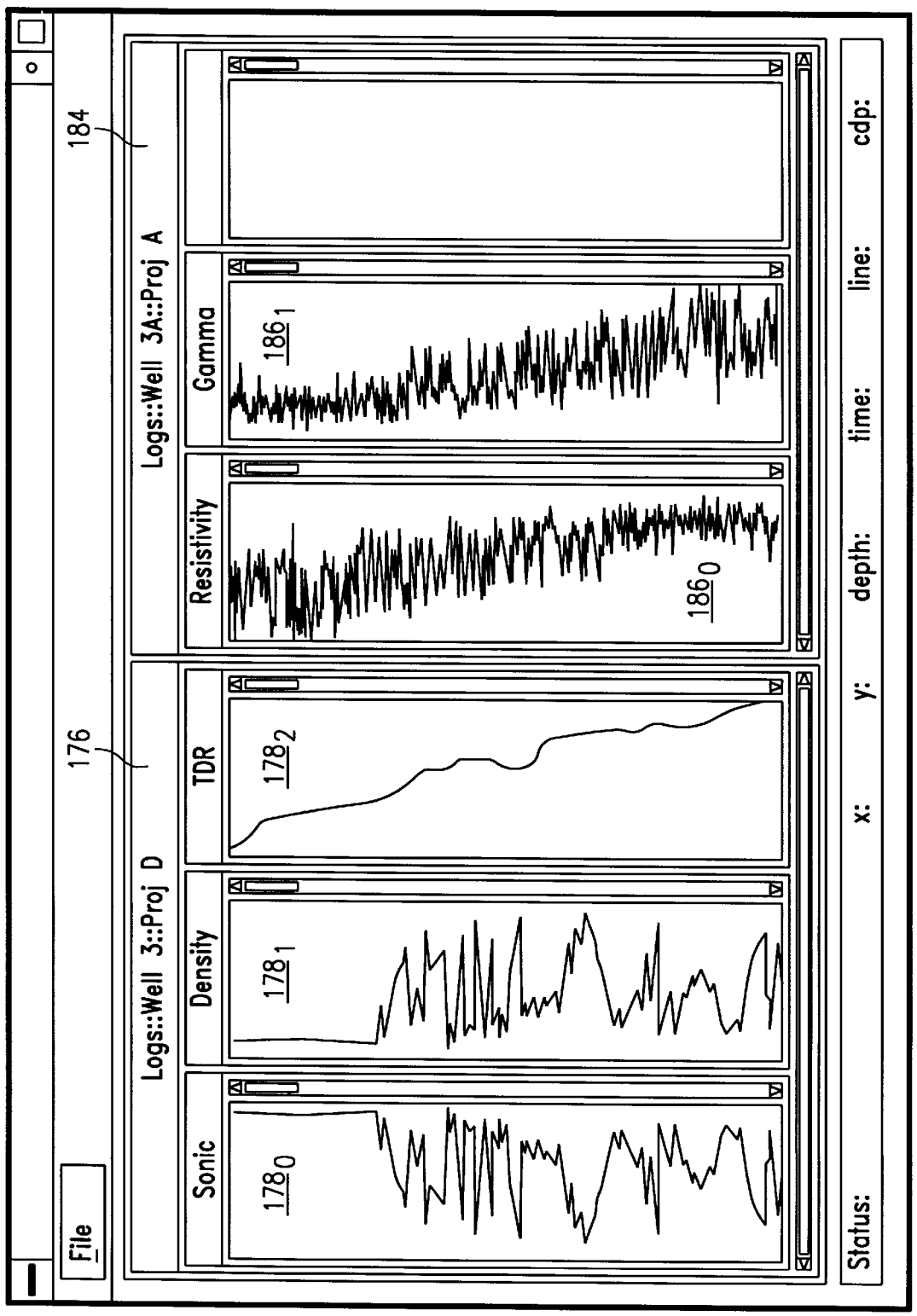

FIG. 9f illustrates the output of graphics display 27 after two passes through processes 164, 166, 168 to display well log traces from persistent database 40$_C$, specifically from "Well 3A" of "Project D". This output includes display window 176 as shown in FIG. 9c, along with display window 184 in which subwindows 186$_0$, 186$_1$, are displaying resistivity and gamma well log traces, respectively. As evident from FIG. 9f, analysis application program 50 is readily able to process and simultaneously display geologically-related data obtained from different, vendor-specific, persistent databases 40. As described relative to FIG. 8, the operation of analysis application program 50 is performed using an abstract object interface, without requiring knowledge of vendor-specific functionality for the specific databases 40$_B$, 40$_C$. No translator programs are required, and only one underlying copy of the data results from the completion of the program.

According to the preferred embodiment of the invention, therefore, a method and system for performing geological and geophysical abstraction and analysis is provided. The computer system and method provides the important advantage of making multiple database sources available to various application programs without requiring vast numbers of translation programs and input/output links, as required according to conventional techniques. In addition, the computer system and method enables only a single copy of the underlying data to be maintained, thus eliminating a significant source of error that can result from loss of data coherency among multiple differing copies of the same set of underlying data.

A further advantage provided by the preferred embodiments of the present invention arises from the ability to add each new incremental data source by performing only a single translation using a known interface, rather than requiring multiple translations of the new data source to correspond to each available analysis program, generally requiring the generation and programming of a new interface in each instance. Conversely, the preferred embodiment of the present invention also enables the addition of each new incremental analysis application program without requiring any additional database translation.

Furthermore, the preferred embodiment of the invention described hereinabove is particularly directed to the analysis of geological and geophysical information by a range of application programs. The flexibility provided by the present invention enables the use of information from diverse sources, such as seismic surveys of various types, well logs, potential field surveys, well performance statistics, and the like, and makes these various data sources available to a wide range of analysis applications, including such dissimilar applications as statistical evaluation, data translation, graphic visualization, and interactive survey design.

Other advantages of the present invention will also be apparent to those of ordinary skill in the art having reference to the foregoing specification together with its drawings.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer for processing geologically-related data by way of a selected one of a plurality of analysis application programs, wherein the geologically-related data is stored in a storage medium in a plurality of persistent databases arranged according to a plurality of vendor formats, comprising the steps of:

initiating the operation of the selected one of the plurality of analysis application programs;

selecting a first one of the plurality of persistent databases, the selected persistent database containing geologically-related data stored according to a first one of the plurality of vendor formats;

after the selecting step, instantiating a first concrete object corresponding to the first persistent database;

instantiating a first abstract object corresponding to the first concrete object, the first abstract object comprising data members and function members; and operating the selected analysis application program to process geologically-related data by executing at least one of the function members of the first abstract object without specifying one of the plurality of vendor formats.

2. The method of claim 1, wherein the operating step comprises:

retrieving geologically-related data from the first persistent database;

processing the retrieved geologically-related data; and storing the processed geologically-related data in the first persistent database.

3. The method of claim 1, wherein the first abstract object has at least one function member corresponding to a virtual function;

and wherein the first concrete object includes a specified function member corresponding to the virtual function.

4. The method of claim 3, wherein the specified function member in the first concrete object includes a function programmed according to the first vendor format.

5. The method of claim 4, further comprising:

selecting a second one of the plurality of persistent databases, the second persistent database containing geologically-related data stored according to a second one of the plurality of vendor formats;

after the selecting step, instantiating a second concrete object corresponding to the second persistent database; and instantiating a second abstract object corresponding to the second concrete object, the second abstract object comprising data members and function members;

and wherein the step of operating the selected analysis application program further comprises executing at least one of the function members of the second abstract object without specifying one of the plurality of vendor formats.

6. The method of claim 5, wherein the step of operating the selected analysis application comprises:

retrieving data from the first persistent database; and storing the retrieved data in the second persistent database;

wherein the first and second ones of the plurality of vendor formats differ from one another.

7. The method of claim 5, wherein the second concrete object has a specified function member, corresponding to a virtual function member of the second abstract object, that includes a function programmed according to the second vendor format.

8. The method of claim 1, wherein the first abstract object specifies a plurality of objects in a first subclass;
and further comprising the steps of:
instantiating a first concrete subclass object selected from the plurality of objects in the first subclass; and
instantiating a first abstract subclass object corresponding to the first concrete subclass object and comprising data members and function members.

9. The method of claim 8, wherein the first abstract subclass object includes a set of function members including at least the function members of the first abstract object, and includes a set of data members including at least the data members of the first abstract object.

10. The method of claim 1, wherein the geologically-related data stored by the first persistent database comprises well log measurements.

11. The method of claim 1, wherein the geologically-related data stored by the first persistent database comprises seismic survey measurements.

12. The method of claim 1, further comprising:
selecting the second one of the plurality of persistent databases, the second persistent database containing geologically-related data that are stored according to a second one of the plurality of vendor formats;
after the selecting step, instantiating a second concrete object corresponding to the second persistent database; and
instantiating a second abstract object corresponding to the second concrete object, the second abstract object comprising data members and function members;
and wherein the step of operating the selected analysis application comprises:
retrieving a selected well log measurement signal from the first persistent database by executing a function member of the first abstract object without specifying the first vendor format;
retrieving a selected seismic survey signal from the second persistent database by executing a function member of the second abstract object without specifying the second vendor format; and
simultaneously displaying the selected well log measurement and the selected seismic survey signal on a graphics display.

13. The method of claim 12, wherein the geologically-related data stored by the first persistent database comprise well log measurements.

14. The method of claim 13, wherein the geologically-related data stored by the second persistent database comprise seismic survey measurements.

15. A computer system for processing geologically-related data, comprising:
storage media for storing computer readable signals corresponding to:
a plurality of analysis application programs; and
a plurality of persistent databases, each of the plurality of persistent databases storing geologically-related data according to one of a plurality of vendor formats;
at least one input device for receiving user inputs;
at least one output device for displaying processing results; and
a system computer, coupled to the storage media, to the at least one input device, and to the at least one output device, and programmed to execute an analysis application program by performing the steps of:
initiating the operation of a selected one of the plurality of analysis application programs;

receiving an input from the at least one input device indicating a first one of the plurality of persistent databases, the first persistent database storing geologically-related data according to a first one of the plurality of vendor formats;
after the selecting step, instantiating a first concrete object corresponding to the first persistent database;
instantiating a first abstract object corresponding to the first concrete object, the first abstract object comprising data members and function members; and
operating the selected analysis application program to process geologically-related data by executing at least one of the function members of the first abstract object without specifying one of the plurality of vendor formats.

16. The system of claim 15, wherein the system computer is programmed to perform the operating step by:
retrieving geologically-related data from the first persistent database;
processing the retrieved geologically-related data; and
storing the processed geologically-related data in the first persistent database according to the first vendor format.

17. The system of claim 15, wherein the first abstract object has at least one function member corresponding to a virtual function;
and wherein the first concrete object includes a specified function member corresponding to the virtual function.

18. The system of claim 17, wherein the specified function member in the first concrete object includes a function programmed according to the first vendor format.

19. The system of claim 15, wherein the system computer is further programmed to perform the operations of:
receiving an input from the at least one input device indicating a second one of the plurality of persistent databases, the second persistent database storing geologically-related data stored according to a second one of the plurality of vendor formats;
after the selecting step, instantiating a second concrete object corresponding to the second persistent database; and
instantiating a second abstract object corresponding to the second concrete object, the second abstract object comprising data members and function members;
and wherein the step of operating the selected analysis application program further comprises executing at least one of the function members of the second abstract object without specifying one of the plurality of vendor formats.

20. The system of claim 19, wherein the system computer is further programmed to perform the operation of operating the selected analysis application by:
retrieving data from the first persistent database; and
storing the retrieved data in the second persistent database;
wherein the first and second ones of the plurality of vendor formats differ from one another.

21. The system of claim 15, wherein the geologically-related data stored by the first persistent database in the memory comprises well log measurements.

22. The system of claim 15, wherein the geologically-related data stored by the first persistent database in the memory comprises seismic survey measurements.

23. The system of claim 15, wherein the system computer is further programmed to perform the operations of:
receiving an input from the at least one input device indicating a second one of the plurality of persistent databases, the second persistent database storing geologically-related data according to a second one of the plurality of vendor formats;

after the selecting step, instantiating a second concrete object corresponding to the second persistent database; and instantiating a second abstract object corresponding to the second concrete object, the second abstract object comprising data members and function members;

and wherein the system computer is further programmed to perform the operation of operating the selected analysis application program by:

retrieving a selected well log measurement signal from the first persistent database by executing a function member of the first abstract object without specifying the first vendor format;

retrieving a selected seismic survey signal from the second persistent database by executing a function member of the second abstract object without specifying the second vendor format; and simultaneously displaying the selected well log measurement and the selected seismic survey signal on the at least one output device.

24. The system of claim 23, wherein the geologically-related data stored by the first persistent database in the memory comprise well log measurements.

25. The system of claim 24, wherein the geologically-related data stored by the second persistent database in the memory comprise seismic survey measurements.

* * * * *